United States Patent
Joe et al.

(10) Patent No.: US 6,658,338 B2
(45) Date of Patent: Dec. 2, 2003

(54) ENHANCED RATIO CONTROL IN A TOROIDAL DRIVE

(75) Inventors: Shinichiro Joe, Kanagawa (JP); Taketoshi Kawabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/062,499

(22) Filed: Feb. 5, 2002

(65) Prior Publication Data

US 2002/0161503 A1 Oct. 31, 2002

(30) Foreign Application Priority Data

Feb. 6, 2001 (JP) .......................................... 2001-029547

(51) Int. Cl.[7] .................................................. G06F 7/00
(52) U.S. Cl. .............................. 701/51; 701/61; 476/41
(58) Field of Search .............................. 701/51, 52, 60, 701/61; 477/41; 476/10, 40, 41, 46

(56) References Cited

U.S. PATENT DOCUMENTS

| | | | |
|---|---|---|---|
| 5,027,668 A | | 7/1991 | Nakano ........................ 74/200 |
| 5,334,097 A | * | 8/1994 | Tatara et al. .................... 476/8 |
| 5,669,845 A | | 9/1997 | Muramoto et al. .......... 475/186 |
| 5,902,208 A | | 5/1999 | Nakano ........................ 476/42 |
| 6,152,850 A | * | 11/2000 | Inoue et al. ................... 476/46 |
| 6,217,477 B1 | * | 4/2001 | Nobumoto et al. ........... 477/41 |

FOREIGN PATENT DOCUMENTS

| | | |
|---|---|---|
| EP | WO 01/21981 A2 * | 3/2001 |
| JP | 8-270772 | 10/1996 |

OTHER PUBLICATIONS

U.S. patent application Ser. No. 09/940,875, Hirano et al., filed Aug. 29, 2001.

* cited by examiner

*Primary Examiner*—Yonel Beaulieu
(74) *Attorney, Agent, or Firm*—Foley & Lardner

(57) ABSTRACT

Enhanced ratio control in a toroidal drive of a T-CVT is provided. A factor of proportionality is computed by which a trunnion axial displacement and a T-CVT ratio rate are related. A filter in the form of a characteristic equation is established. This filter includes a physical quantity indicative of the T-CVT ratio and a physical quantity indicated by an actuator command, as inputs, a quasi-state quantity, as a state quantity, and a transition coefficient for the quasi-state quantity. The transition coefficient includes an observer gain. The quasi-state quantity is computed using the filter. An estimated quantity of a system state quantity of the T-CVT is computed using the quasi-state quantity, the observer gain, and a trunnion angular position. The system state quantity includes at least the first physical quantity. The observer gain is corrected in response to the factor of proportionality to keep the transition coefficient unaltered.

20 Claims, 25 Drawing Sheets

ENHANCED RATIO CONTROL IN A TOROIDAL DRIVE

BACKGROUND OF THE INVENTION

1. Field of the Invention

The present invention relates to a method and a system for enhanced ratio control in a toroidal drive.

2. Description of the Background Art

Continuously variable transmissions (CVT's) are transmissions that change a speed ratio continuously, not in discrete intervals. This continuous nature of CVT's gives them an infinite number of speed ratios, making them very attractive for automotive use.

Various types of CVT are known. One such example is a CVT with pulley/V-belt power transfer. Another example is a CVT with disc/roller power transfer. The CVT of this type is often referred to as a toroidal-type CVT (T-CVT) because it transmits torque from one rotating semi-toroidal disc to another semi-toroidal disc by traction rollers through a traction force. The two semi-toroidal discs form a toroidal cavity. In each toroidal cavity, it is preferred to have two traction rollers in equiangularly spaced relationship engaging the discs for transmission of motion therebetween. While three or four traction rollers may be disposed in spaced relationship in each toroidal cavity and will provide increased life for contact surfaces as the total surface area is increased, two traction rollers are preferred for simplicity.

Each traction roller is rotatably supported by a pivot trunnion, respectively. The pivot trunnions, in turn, are supported to pivot about their respective pivot axis. In order to controllably pivot the pivot trunnions for a ratio change, a hydraulic control means is provided. The hydraulic control means is included in a hydraulic cylinder at each pivot trunnion and includes a control volume defined in the hydraulic cylinder between a piston and an axial end of the hydraulic cylinder The pistons within the hydraulic cylinders are connected to the pivot trunnions along their pivot axis by rods. The piston and its associated rod are thereby rotatable about the pivot axis with the associated pivot trunnion. Variation of the control volume causes the piston to move relative to the hydraulic cylinder, and applies a control force to displace the pivot trunnions. Control forces applied displace the pivot trunnions in the opposite directions along their pivot axis. As a result, the pivot trunnions are caused to pivot about their respective pivot axis, due to the forces present in the rotating toroidal discs, for initiating ratio change.

For terminating the ratio change when a desired ratio has been obtained, a feedback structure is provided. The feedback structure preferably includes a source of hydraulic pressure, and a ratio control valve for controlling the flow of hydraulic fluid for initiating ratio change. The feedback structure further includes a mechanism associated with at least one pivot trunnion to adjust the ratio control valve upon pivotal movement of the pivot trunnion to a desired ratio. The mechanism is preferably a cam connected to a pivot trunnion. The cam may be linked mechanically and/or electronically to operate the ratio control valve upon reaching a desired rotation.

Various ratio control strategies have been proposed. One such example is proposed by the assignee of the present invention in U.S. Pat. No. 5,669,845 (=JP-A 8-270772) issued Sep. 23, 1997 to Muramoto et al. According to this known control strategy, a feedback structure includes a source of hydraulic pressure, a ratio control valve, a bell crank, and a cam. The ratio control valve has a valve sleeve connected to a stepper motor. The ratio control valve further has a valve spool disposed within the valve sleeve. The valve spool has a rod projecting out of the valve sleeve for engagement with the bell crank. The bell crank is connected to the rod at one end. At the other end, the bell crank engages the cam connected to a pivot trunnion. At a middle point between the two ends, the bell crank is supported to pivot about the middle point.

The valve sleeve is positionable in response to an actuator command from a T-CVT controller to establish various speed ratios between input and output shafts of the T-CVT. The actuator command is indicative of motor steps of the stepper motor. The axial displacement of the valve sleeve has one-to-one and onto any selected number of motor steps.

To compute the number of motor steps, the T-CVT controller determines a desired engine or input shaft speed against vehicle speed and throttle position using a look-up table map. The desired input shaft speed is used in cooperation with actual output shaft speed to determine a desired ratio. Using a predetermined relationship, the T-CVT controller determines a desired trunnion angular position. Using the desired trunnion angular position, the T-CVT controller computes a feedforward term and a feedback term by carrying out proportional and integral control actions. Besides, the T-CVT controller computes a damping term using an estimated value of trunnion axial displacement given by a state observer. Combining the feedforward, feedback and damping terms gives the motor steps.

This known ratio control is satisfactory to some extent. As far as the inventors are aware of, huge amount of computer simulation and field test would be needed in designing such a T-CVT controller to ensure quick reduction of error in estimation, if occurred, by state observer, requiring increased cost and time in developing a desired control system.

Accordingly, a need remains for enhanced ratio control in a toroidal drive of a T-CVT, which does not require increased cost and time in developing a desired control system.

An object of the present invention is to provide a method and a system for enhanced ratio control in a toroidal drive of a T-CVT to meet the above-mentioned need.

SUMMARY OF THE INVENTION

According to one aspect of the present invention, a method for enhanced ratio control in a toroidal drive of a toroidal-type continuously variable transmission (T-CVT) is provided. The T-CVT includes a ratio control element positionable in response to an actuator command to establish various ratios between input and output shaft speeds of the T-CVT. The toroidal drive has toroidal discs defining a toroidal cavity, and traction roller assemblies having pivot trunnions rotatably supporting traction rollers disposed in the toroidal cavity and engaged between the toroidal discs. The method comprises:

computing a factor of proportionality by which a first physical quantity and a second physical quantity are related, the first physical quantity being a trunnion axial displacement of a predetermined one of the pivot trunnions, the second physical quantity being indicative of a ratio rate of the ratio between the input and output shaft speeds of the T-CVT;

establishing a filter in the form of a characteristic equation that includes a third physical quantity and a fourth physical quantity, as inputs, a quasi-state quantity, as a state quantity, and coefficients including a transition coefficient for the quasi-state quantity, the transition coefficient including an observer gain, the third physical quantity being indicative of the ratio between the input and output shaft speeds of the T-CVT, the fourth physical quantity being indicated by the actuator command;

computing the quasi-state quantity using the filter;

computing an estimated quantity of a system state quantity of the T-CVT using the quasi-state quantity, the observer gain, and a fifth physical quantity indicative of a trunnion angular position of the predetermined pivot trunnion, the system state quantity including at least the first physical quantity; and correcting the observer gain in response to the factor of proportionality to keep the transition coefficient unaltered.

BRIEF DESCRIPTION OF THE DRAWINGS

Further objects and advantages of the invention will be apparent from reading of the following description in conjunction with the accompanying drawings.

DESCRIPTION OF THE EMBODIMENTS

Figure 1:
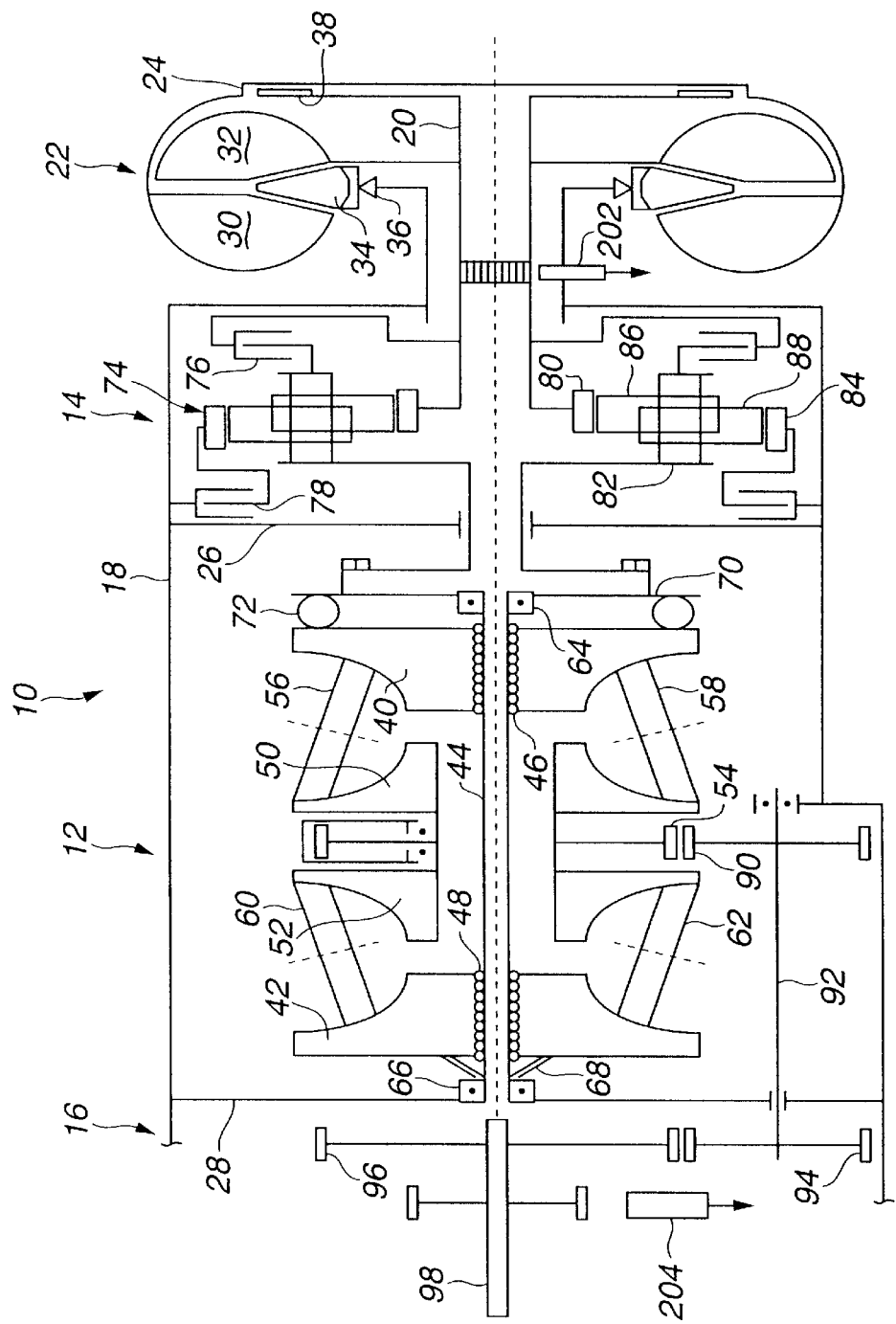
FIG. 1 is a schematic top view of a traction drive system, in the form of a T-CVT, including a dual cavity toroidal drive, a planetary drive, and a hydraulic drive.
Figure 2:
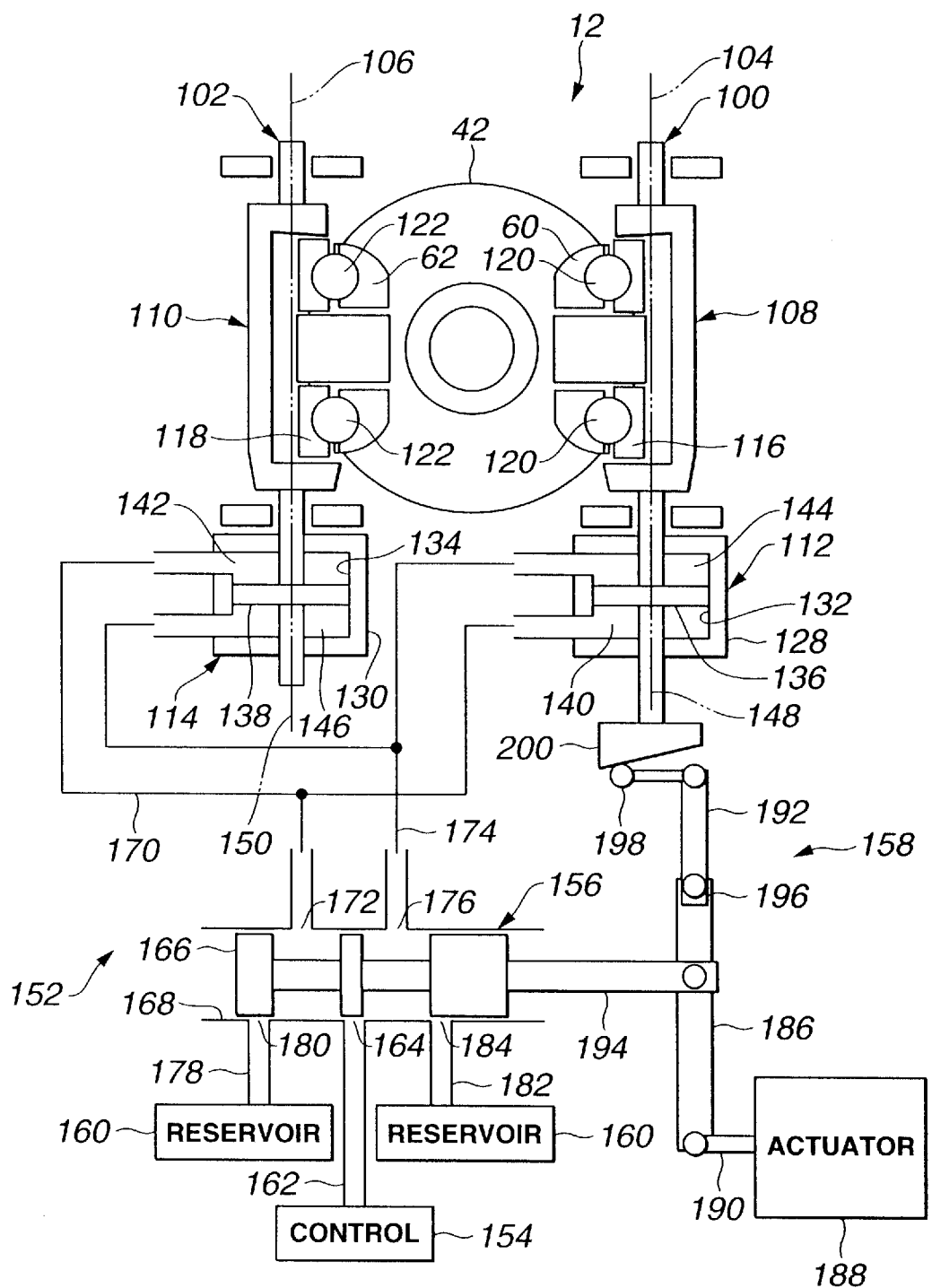
FIG. 2 is a schematic side view of a pair of traction roller assemblies disposed in the rearward cavity of the toroidal drive of FIG. 1 and a schematic representation of a pressure control for a traction drive.

Referring to FIGS. 1 and 2, a T-CVT 10 includes a dual cavity toroidal drive 12 coaxially connected to a forward positioned input gear section 14 and connected also to a rearward positioned output gear section 16. For purpose of clarification, the terms front or forward refer to the right side, and rear or rearward refer to the left side of the view shown in FIG. 1. All three elements 12, 14 and 16 are enclosed in a housing 18 and driven by an input or turbine shaft 20 that is powered by an engine (not shown) through a torque converter 22 or a lock-up clutch 24. Housing 18 has three chambers, one for each element 12, 14 and 16, separated by walls 26 and 28. Torque converter 22 is a conventional torque converter including a pump impeller 30 connected to the engine, a turbine runner 32 connected to input shaft 20, and a stator 34 grounded via a one-way brake 36. Lock-up clutch 24 is a conventional lock-up clutch including a clutch element 38 connected to input shaft 20.

Dual cavity toroidal drive 12 includes first and second outboard traction discs 40 and 42 mounted on a torque sleeve 44 via ball splines 46 and 48 to rotate in unison. Toroidal drive 12 further includes two inboard traction discs 50 and 52, which are positioned back-to-back and rotatably mounted on sleeve 44, and both coupled to an output gear 54 to rotate in unison. Two inboard traction discs 50 and 52 may be formed as one integral element formed with output gear 54. In this case, the integral element is a dual-faced single disc element rotatably supported by sleeve 44. One example of a dual cavity toroidal drive having dual inboard discs positioned back-to-back is disclosed in U.S. Pat. No. 5,902, 208 issued May 11, 1999 to Nakano, which is incorporated in its entirety herein by reference. Another example of a dual cavity toroidal drive having a dual-faced single disc element formed with an output gear is disclosed in co-pending U.S. patent application Ser. No. 09/940,875 commonly assigned herewith, which is incorporated in its entirety herein by reference. A toroidal cavity is defined between each outboard discs 40 and 42 and one of the inboard discs 50 and 52. A pair of motion transmitting traction rollers 56, 58, 60 and 62 is disposed in each toroidal cavity, with one roller being disposed transversely on either side of each cavity (see FIGS. 1 and 2). Each pair of traction rollers 56, 58, 60 and 62 are mirror images of the other pair; therefore, only the one pair of rollers 60 and 62 are illustrated in FIG. 2. Each pair of traction rollers 56, 58, 60 and 62 are engaged between each outboard discs 40 and 42 and one of the inboard discs 50 and 52 in circles of varying diameters depending on the transmission ratio. Traction rollers 56, 58, 60 and 62 are so supportive that they can be moved to initiate a change in the ratio. That is, each roller 56, 58, 60 and 62 can be actuated to vary its diameter and provide a substantial normal force at their points of contact with the corresponding discs to sufficiently support the traction forces needed to effect the change in ratio. With outboard discs 40 and 42 being rotated continuously by the engine, outboard discs 40 and 42 impinge on traction rollers 56, 58, 60 and 62, causing the traction rollers to rotate. As they rotate, the traction rollers impinge on and rotate inboard discs 50 and 52 in a direction opposite to that of rotating outboard discs 40 and 42. The structure and operation of the other elements of the toroidal drive 12 will be discussed later on in the specification, With continuing reference to FIG. 1, toroidal drive 12 employs a cam loading system to control normal force between toroidal discs (50, 52, 60, 62) and traction rollers (56, 58, 60, 62). The cam loading system operates on outboard discs 40 and 42 to apply an axial force that is a linear function of the input torque. Describing, in detail, the cam loading system, torque sleeve 44 extends beyond the backs of outboard discs 40 and 42 and has flanges (not shown) at its front and rear ends to carry thrust bearings 64 and 66. The cam loading system includes a disc spring (Belleville spring) 68, which is supported on torque sleeve 44 between thrust bearing 66 and the back of toroidal disc 42 to operate on the disc. The cam loading system also includes a drive plate 70 rotatably supported by torque sleeve 44 via thrust bearing 64. The cam loading system further includes cam rollers 72, which are disposed between drive plate 70 and toroidal disc 40. An example of a cam loading system having cam rollers between a drive plate and one of outboard toroidal discs is disclosed in U.S. Pat. No. 5,027,668 issued Jul. 2, 1991 to Nakano, which is incorporated in its entirety herein by reference.

Drive plate 70 of the cam loading system is drivingly connected to input shaft 20 through input gear section 14. Input gear section 14 includes a dual-pinion planetary gear system (DPGS) 74, a forward clutch 76, and a reverse brake 78. DPGS 74 includes, in a conventional manner, a sun gear 80, a carrier 82, a ring gear 84, and a plurality of pairs of intermeshed planet pinions 86 and 88 rotatably supported by pins of carrier 82. Pinions 86 and 88 are disposed between sun and ring gears 80 and 84, with inner pinions 86 in engagement with sun gear 80 and outer pinions 88 in engagement with ring gear 84. Sun gear 80 is coupled with input shaft 20 to rotate in unison. Carrier 82 is connected to drive plate 70 of the cam loading system for rotation in unison. Carrier 82 is connectable to input shaft 20 through forward clutch 76. Ring gear 84 is connectable to housing 18 through reverse brake 78.

Input gear section 14 including DPGS 74 functions to establish torque transmission in forward drive mode or reverse drive mode. In the forward drive mode, forward clutch 76 is engaged with reverse brake 78 released. In the reverse drive mode, reverse brake 78 is applied with forward clutch 76 disengaged. In this manner, input torque is applied to drive plate 70 to continuously rotate outboard toroidal discs 40 and 42 in the same direction as that of input shaft 20 in the forward drive mode, but in a direction opposite to that of input shaft 20 in the reverse drive mode. The input torque is transmitted from outboard discs 40 and 42 to inboard discs 50 and 52 to rotate output gear 54.

Output gear section 16 including an input gear 90 of a counter shaft 92 functions to provide torque transmission from output gear 54. Output gear 54 is in engagement with input gear 90 of counter shaft 92, which has an output gear 94.

Output gear section 16 also includes a gear 96 of an output shaft 98. Output gear section 16 may include an idler gear (not shown) between output gear 94 and gear 96. Rotation of inboard toroidal discs 50 and 52 is transmitted via output gear 54, gear 90, counter shaft 92, gear 94 and gear 96 to output shaft 98.

Referring to FIG. 2, toroidal drive 12 in this embodiment includes two traction rollers 60, 62 in each toroidal cavity.

Each of the rollers 60, 62 is rotatably supported by a pivot trunnion 100, 102, respectively. Pivot trunnions 100, 102, in turn, are supported to pivot about their respective pivot axis 104, 106. Each of traction rollers 60, 62 and the corresponding pivot trunnion 100, 102 are components of traction roller assemblies 108, 110.

As is well known to those skilled in the art, the surfaces of toroidal discs 40, 42, 50, 52 defining cavities have a radius of curvature, the origin of which coincides with the pivot axis 104, 106. This geometry permits the pivot trunnions and traction rollers to pivot and maintain contact with the surfaces of the toroidal discs.

Traction roller assemblies 108, 110 each also include a hydraulic piston assembly 112, 114 in addition to the pivot trunnion 100, 102. Pivot trunnions 100, 102 each have a backing plate 116, 118 that supports traction roller 60, 62 rotatably. Bearings 120, 122, positioned between plate 116, 118 and traction roller 60, 62, permit relative rotation between backing plate 116, 118 and traction roller 60, 62. Backing plates 116, 118 each have an extension 124, 126 that supports traction roller 60, 62, on a bearing not shown, for rotation.

Hydraulic piston assembly 112, 114 includes a housing 128, 130 enclosing a cylinder 132, 134 in which is slidably disposed a piston and rod 136, 138. Piston and rod 136, 138 divides cylinder 132, 134 into equal area chambers including a first chamber 140, 142 and a second chamber 144, 146. Piston and rod 136, 138 is disposed so that its centerline 148, 150 is disposed substantially along pivot axis 104, 106, respectively. So positioned, piston and rod 136, 138 is able to pivot about pivot axis 104, 106 with pivot trunnion 100, 102, respectively.

The pressure in first and second chambers 140, 142; 144, 146 is established by a hydraulic control system 152. Hydraulic control system 152 includes a pump, not shown, an electro-hydraulic control 154, a ratio control valve 156, and a feedback structure 158. The pump is a conventional pump that draws hydraulic fluid from a reservoir 160 and delivers the fluid to electro-hydraulic control 154 from which the fluid is delivered to ratio control valve 156.

Control 154 delivers system (or line) pressure to a passage 162 that is connected to an inlet port 164 of ratio control valve 156. Ratio control valve 156 has a spool 166 slidably disposed in a valve bore 168. Valve bore 168 is in fluid communication with passage 162 via inlet port 164. Valve bore 168 is also in fluid communication with a first control passage 170 via a first control port 172, and with a second control passage 174 via a second control port 176. Valve bore 168 is further in fluid communication with a first drain passage 178 via a first drain port 180, and with a second drain passage 182 via a second drain port 184.

Spool 166 is connected to a feedback lever 186, which is a component of feedback structure 158. A ratio actuator 188, in the form of a stepper motor, for example, receives a control signal. The control signal is an actuator command indicative of motor steps if a stepper motor is used as the actuator. In response to the control signal, actuator 188 moves feedback lever 186, connected to an actuator shaft 190, to initiate the ratio change in toroidal drive 12. Feedback lever 186 is connected to actuator shaft 190 at one end and to a bell crank 192 at the other end. At a point between the two ends, the feedback lever 186 is pivotally connected to a spool rod 194, which is connected to spool 166 to move in unison. Bell crank 192 has one end 196 pivotally connected to the other end of feedback lever 186 and the other end 198. The other end 198 of bell crank 192 is controlled by the angular position about pivot axis 104 of traction roller assembly 108 through contact with a cam 200 formed on piston and rod 136. As actuator 188 moves feedback lever 186, valve 156, in response to movement of valve rod 194, alters the hydraulic pressure in lines 170 and 174. Hydraulic pressure is provided to the valve 156 through line 162, which is supplied with system or line pressure. As the pressure in lines 170 and 174 is altered, traction roller assemblies 108 and 110 move along pivot axis 104 and 106 in the opposite directions and then pivot about pivot axis 104 and 106, changing the ratio in toroidal drive 12. As traction roller assembly 108 pivots, lever 186 moves, due to rotation of cam 200 and movement of bell crank 192, repositioning valve rod 194, providing means for valve 156 to reinstate the pressure in lines 170 and 174 to stop traction roller assemblies 108 and 110 from pivoting.

Actuator 188 controls displacement of actuator shaft 190, which, in turn, controls the ratio in toroidal drive 12. If actuator 188 is in the form of a stepper motor, as is in exemplary embodiments of the present invention, controlling angular displacement of stepper motor in terms of motor steps controls the ratio in toroidal drive 12.

Figure 3:
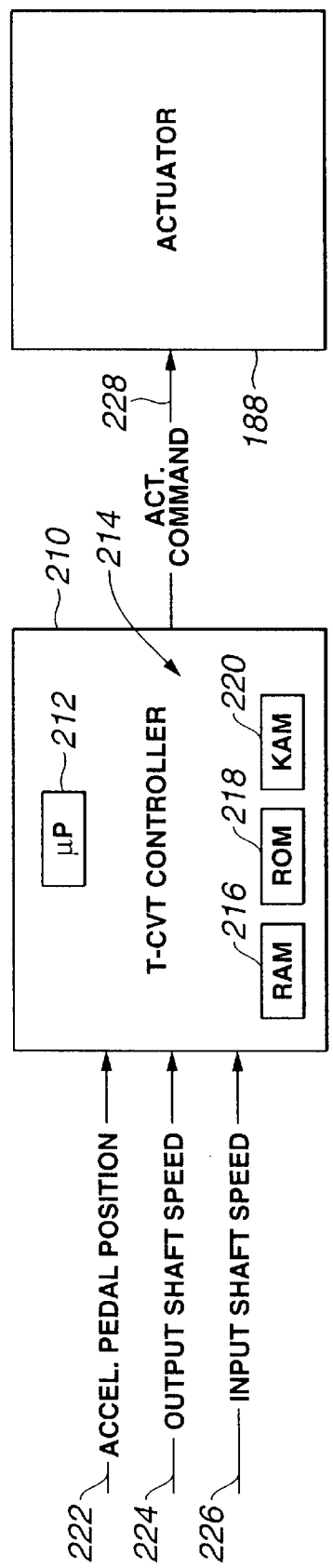
FIG. 3 is a block diagram showing the relationship between a T-CVT controller and an actuator.

As shown in FIG. 1, the speed of the input shaft 20 is detected by an input speed sensor 202 and fed, as an input shaft speed signal $\omega_i$, to a T-CVT controller 210 (see FIG. 3). The speed of the output shaft 98 is detected by an output speed sensor 204 and fed, as an output shaft speed signal $\omega_o$, to the controller 210. An accelerator pedal position signal APS from an accelerator or gas pedal (not shown) is also fed to the controller 210.

With reference now to FIG. 3, in an exemplary embodiment of the present invention, the T-CVT controller 210 comprises a microprocessor-based controller with an associated microprocessor, represented by a microprocessor 212. The microprocessor 212 communicates with associated computer-readable storage media 214. As will be appreciated by one of ordinary skilled in the art, the computer-readable storage media 214 may include various devices for storing data representing instructions executable by the microprocessor to control the T-CVT 10. For example, the computer-readable storage media 214 may include a random access memory (RAM) 216, a read-only memory (ROM) 218, and/or a keep-alive memory (KAM) 220. These functions may be carried out through any of a number of known physical devices including EPROM, EEPROM, flash memory, and the like. The present invention is not limited to a particular type of computer-readable storage medium, examples of which are provided for convenience of description only.

Controller 210 may also include appropriate electronic circuitry, integrated circuits, and the like to carry out control of the T-CVT 10. As such, controller 210 is used to carry out control logic implemented in terms of software (instructions) and/or hardware components, depending upon the particular application. Additional details of control logic implemented by controller 210 are provided with reference to FIGS. 4 to 10.

Controller 210 receives various signals to monitor driver power or torque demand, and operating conditions of T-CVT 10. The various signals include accelerator pedal position signal APS on line 222, output shaft speed signal $\omega_o$ on line 224, and input shaft speed signal $\omega_i$ on line 226. Controller 210 may communicate directly with various sensors including input shaft speed sensor 202 and output shaft speed sensor 204.

Controller 210 processes the signals to determine motor steps u and generates an actuator command indicative of the determined motor steps u. Controller 210 applies the actuator command to actuator 188 via line 228.

Figure 4:
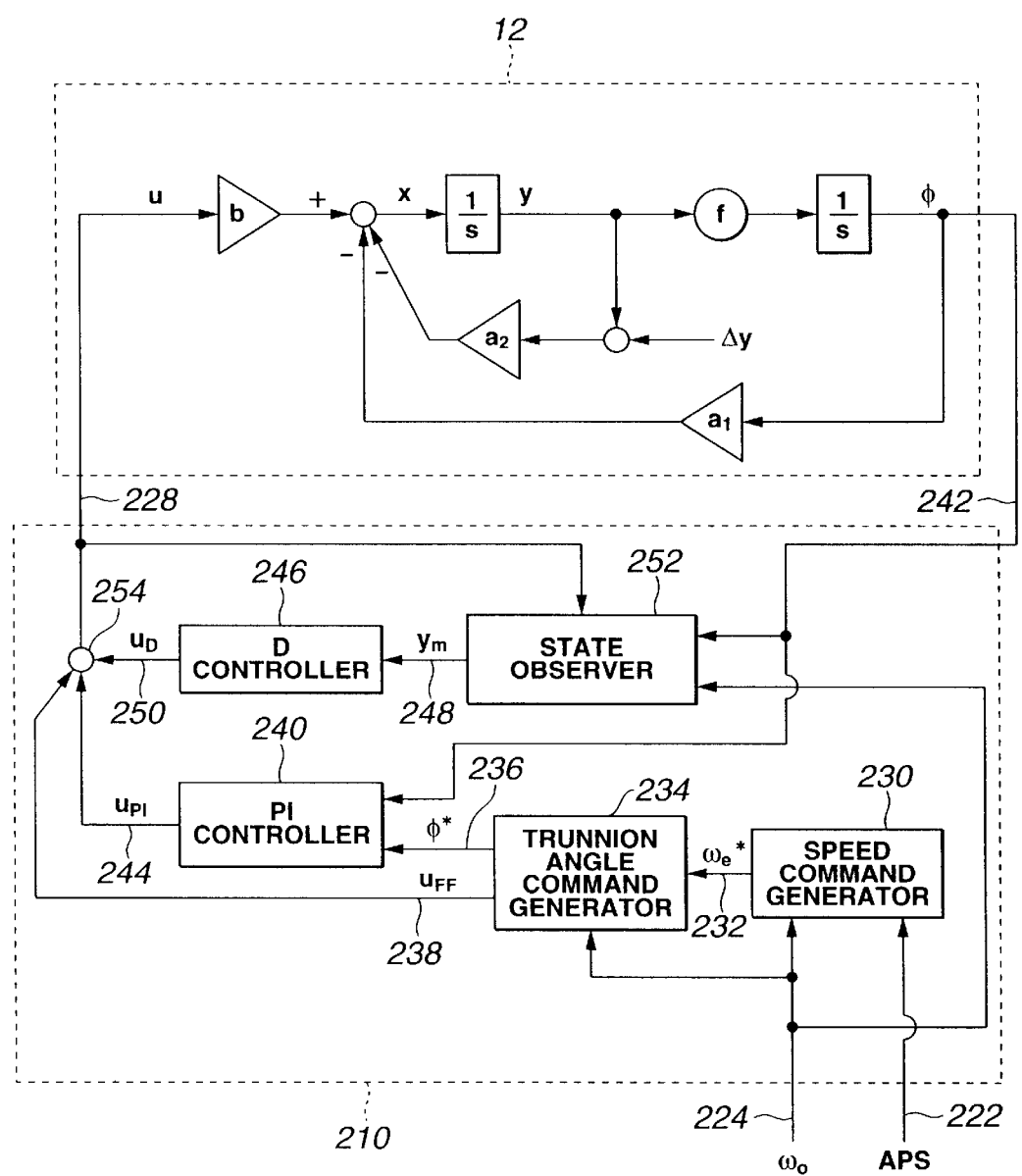
FIG. 4 is a control diagram of a T-CVT controller according to the present invention.

An exemplary embodiment of the present invention can be understood with reference to control diagram shown in FIG. 4. In FIG. 4, motor steps u indicated by actuator command on line 228 is used as a system input to the toroidal drive 12 illustrated by a block diagram. An angular position $\phi$ of the trunnion 100 of traction roller assembly 108 about its pivot axis 104 is used as a system output.

From the preceding description, it is to be noted that the T-CVT 10 includes a ratio control element, in the form of the actuator shaft 190 (see FIG. 2). The ratio control element is positionable in response to an actuator command applied to the actuator 188 to establish various speed ratios between input and output shafts 20 and 98 of the T-CVT 10. The axial displacement of the actuator shaft 190 may be expressed as $$x = -a_1\phi - a_2(y+\Delta y) + bu \qquad (1)$$

where:

x is the axial displacement of actuator shaft 190;

y is the time integral of x and thus the axial displacement, along the pivot axis 104, of trunnion 100 of the traction roller assembly 108;

$\Delta y$ is the external disturbance;

u is the motor steps indicated by the actuator command applied to actuator 188;

$\phi$ is the angular position, about the pivot axis 104, of the trunnion 100 of the traction roller assembly 108;

$a_1$ and $a_2$ are feedback gains, which are determined by the feedback structure 158 including the cam 200; and b is a gain.

The axial displacement y of trunnion 100 will be hereinafter referred to as the trunnion axial displacement, and the axial displacement x of actuator shaft 190 will be hereinafter referred to as the actuator displacement. Trunnion axial displacement y is the time integral of the actuator displacement x. This relationship may be expressed as $$dy = x \qquad (2).$$

Similarly, the angular position $\phi$ of trunnion 100 will be hereinafter referred to as the trunnion angular position. The trunnion angular position $\phi$ is one example of various physical quantities indicative of a speed ratio between the input and output shafts 20 and 98. Another example of such physical quantities is a ratio, which may be hereinafter referred to by the reference character G (=ic), computed from the outputs of input and output speed sensors 202 and 204.

The term "a ratio rate" will be hereinafter used to mean the velocity at which the ratio changes. Mathematically, the ratio rate means the first time derivative of the ratio because the ratio is variable with respect to time. As the trunnion angular position $\phi$ and the ratio G are indicative of the speed ratio between the input and output shafts 20 and 98, their first time derivatives $d\phi$ and $dG$ are physical quantities indicative of ratio rate.

The physical quantity $d\phi$ indicative of ratio rate and another physical quantity that is trunnion axial displacement y are related by a factor of proportionality f as $$d\phi = fy \qquad (3).$$

The factor of proportionality f is computed using a physical quantity indicative of trunnion angular position $\phi$ and another physical quantity indicative of the speed $\omega_o$ of the output shaft 98. The output shaft speed $\omega_o$ is proportional to the speed of the inboard discs 50, 52 of toroidal drive 12. The factor of proportionality f may be computed using an equation expressed as $$f = \frac{\cos(c_{g1} - \phi)\{c_{g0} - \cos(2c_{g1} - \phi)\}}{c_f} \omega_o \qquad (4)$$

where:

$c_{g1}$, $c_{g0}$, and $c_f$ are coefficients, which specify the toroidal drive 12.

Accounting for the above equations (1), (2) and (3), the mathematical model of the system including the toroidal drive 12 may be expressed as $$dx_A = A_A x_A + B_A u \qquad (5)$$

$$x_A = \begin{bmatrix} \phi \\ y \end{bmatrix}$$

$$\phi = C_0 x, C_o = [1 \ 0]$$

$$A_A = \begin{bmatrix} 0 & f \\ -a_i & -a_2 \end{bmatrix}$$

$$B_A = \begin{bmatrix} 0 \\ b \end{bmatrix}$$

where:

u is the input, $x_A$ is the system state quantity and includes, as its matrix elements, the trunnion angular position $\phi$ and the trunnion axial displacement y, x is the displacement of the ratio control element in the form of actuator shaft 190, $C_o$ is a matrix by which $\phi$ and x are related, and $A_A$, $B_A$ are matrices that specify the system including toroidal drive 12.

With continuing reference to FIG. 4, controller 210 is now described. Accelerator pedal position signal APS on line 222 is used as one of two inputs to a speed command generator 230. Output shaft speed signal $\omega_o$ on line 224 is used as the other input to speed command generator 230. The speed command generator 230 outputs a desired engine speed command signal $\omega_e^*$ on line 232. In the speed command generator 230, the vehicle speed VSP is determined by calculating the following equation.

$$VSP = k_V \omega_o$$

WHERE:

$k_V$ is the constant determined accounting for the overall gear ratio from the output shaft 98 to the tire and the diameter of the tire.

Figure 5:
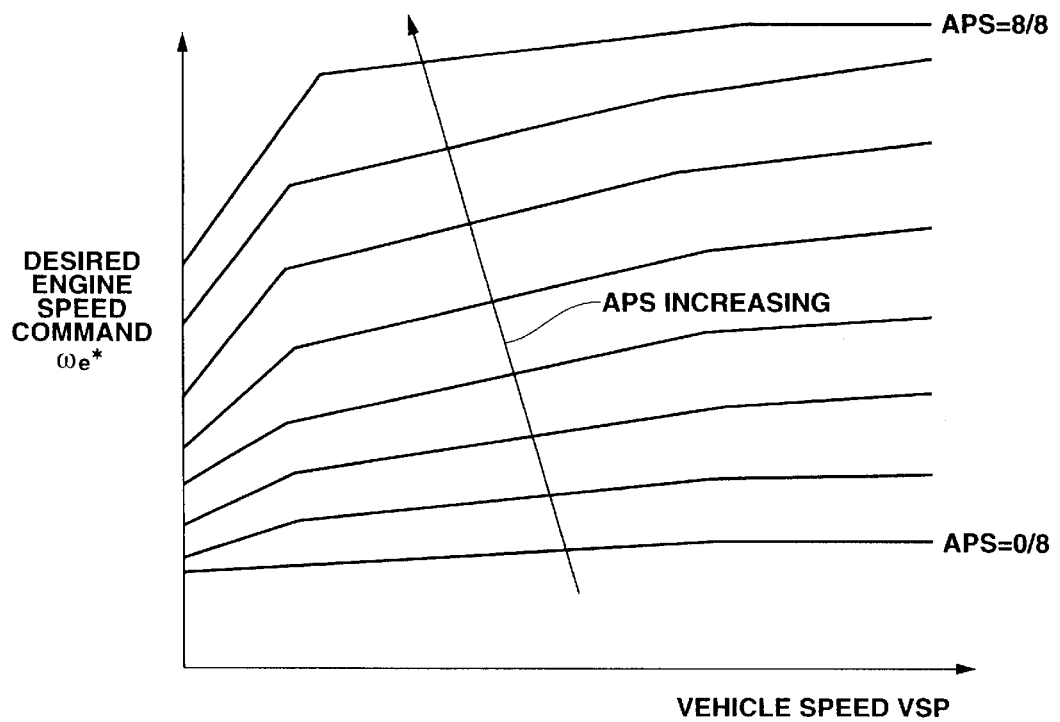
FIG. 5 is a T-CVT map used to determine a desired engine speed command ($\omega_e^*$) appropriate for a selected set of operating variables including vehicle speed (VSP) and accelerator pedal position (APS).

The speed command generator 230 may include a look-up map in computer-readable storage media 214 (see FIG. 3). One example of such a look-up map is a T-CVT map depicted in FIG. 5. In FIG. 5, a plurality of contour lines are illustrated for different accelerator pedal positions APS, such as 0/8, 1/8, ... 8/8, each contour line representing a designed varying of desired engine speed commands $\omega_e^*$ with different vehicle speeds VSP. Using software technique available in the art to implement the relationships illustrated in FIG. 5, a desired engine speed command $\omega_e^*$ may be obtained against a given set of accelerator pedal position signal APS and vehicle speed VSP.

Desired engine speed command $\omega_e^*$ on line 232 is used as one of the two inputs to a trunnion angle or angular position command generator 234. The output shaft speed signal $\omega_o$ on line 224 is used as the other input to the trunnion angle command generator 234. The trunnion angle command generator 234 outputs a desired trunnion angular position command $\phi^*$ on line 236 and a feedforward motor steps command $u_{FF}$ on line 238. In the trunnion angle command generator 234, a desired ratio ic* is determined. The desired ratio may be expressed as $$ic^* = \omega_e^*/\omega_o \qquad (7).$$

Figure 6:
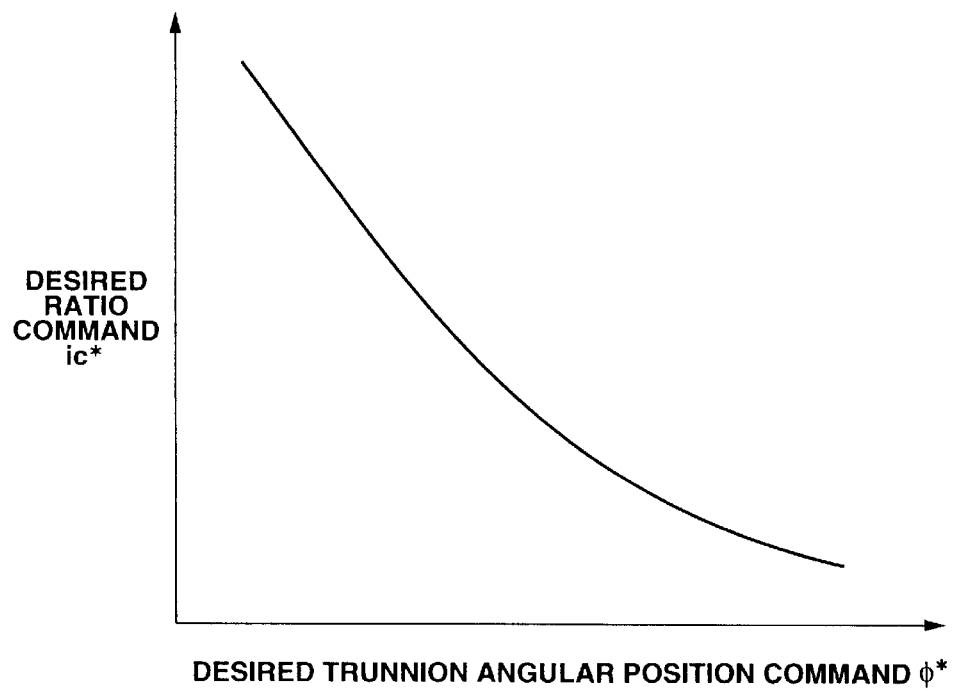
FIG. 6 is a graphical representation of a ratio vs., trunnion angular position characteristic, which may be used, as a conversion map, to relate a desired ratio command (ic*) and a desired trunnion angular position command ($\phi^*$).
Figure 7:
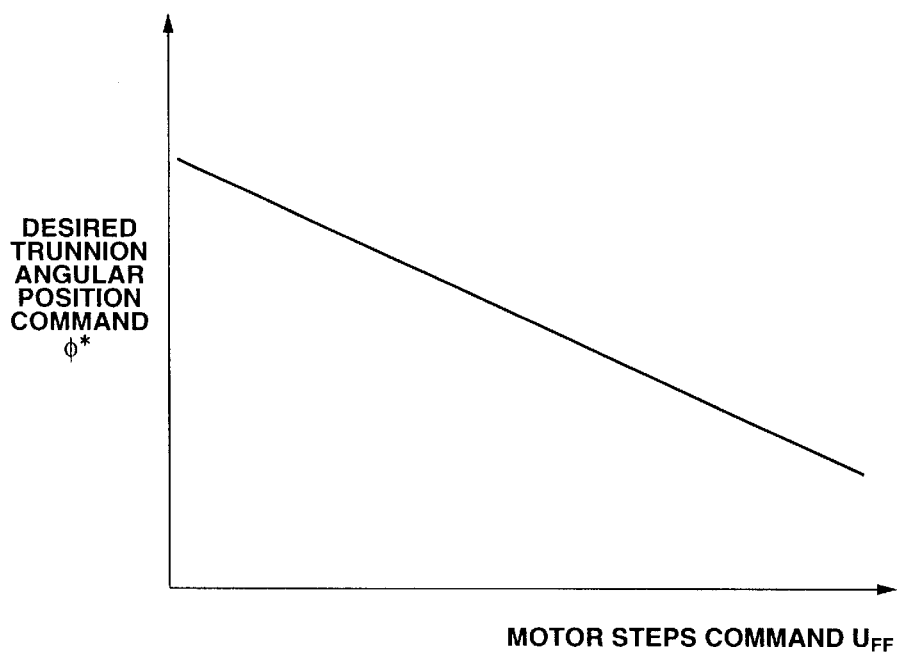
FIG. 7 is a graphical representation of a trunnion angular position vs., motor steps characteristic, which may be used, as a conversion map, to relate a desired trunnion angular position command ($\phi^*$) and a motor steps command ($u_{FF}$) that is indicated by the actuator command.

The trunnion angle command generator 234 may include a look-up map in computer-readable storage media 214 for use in determining desired trunnion angular position command $\phi^*$. One example of such a look-up map is a conversion map depicted in FIG. 6. In FIG. 6, a single contour line is illustrated, which contour line represents a designed varying of desired trunnion angular position command $\phi^*$ with different desired ratio commands ic*. Using software technique available in the art to implement the relationship illustrated in FIG. 6, a desired trunnion angular position command $\phi^*$ may be obtained against a given desired ratio command ic*. The trunnion angle command generator 234 may also include another look-up map in computer-readable storage media 214 for use in determining feedforward motor steps command $u_{FF}$. One example of such a look-up map is a conversion map depicted in FIG. 7. In FIG. 7, a single contour line is illustrated, which contour line represents a designed varying of feedforward motor steps command $u_{FF}$ with different desired trunnion angular position commands $\phi^*$. Using software technique available in the art to implement the relationship illustrated in FIG. 7, a feedforward motor steps command UFF may be obtained against a desired trunnion angular position command $\phi^*$.

Desired trunnion angular position command $\phi^*$ on line 236 is used as one of two inputs to a PI controller 240. An actual trunnion angular position signal $\phi$ from an encoder (not shown) arranged around trunnion 100 (see FIG. 2) is applied to line 242. Actual trunnion angular position $\phi$ may be obtained indirectly if the provision of such encoder is discouraged due to some reasons. The actual trunnion angular position $\phi$ may be obtained by calculating an actual ratio ic and by using the conversion map depicted in FIG. 6. The actual ratio ic may be expressed as $$ic = \omega_i/\omega_o \qquad (8).$$

Actual trunnion angular position signal $\phi$ on line 242 is used as the other input to PI controller 240. PI controller 240 determines an error e by calculating the equation as follows $$e = \phi^* - \phi \qquad (9).$$

PI controller 240 carries out proportional plus integral control action and outputs a PI motor steps command $u_{PI}$ on line 244. The proportional plus integral action may be expressed as $$u_{PI} = K_p e + \frac{K_I}{s} e \qquad (10)$$

where:

$K_p$ is the proportional gain;

$K_I$ is the integral gain; and s is the complex variable.

Figure 8A:
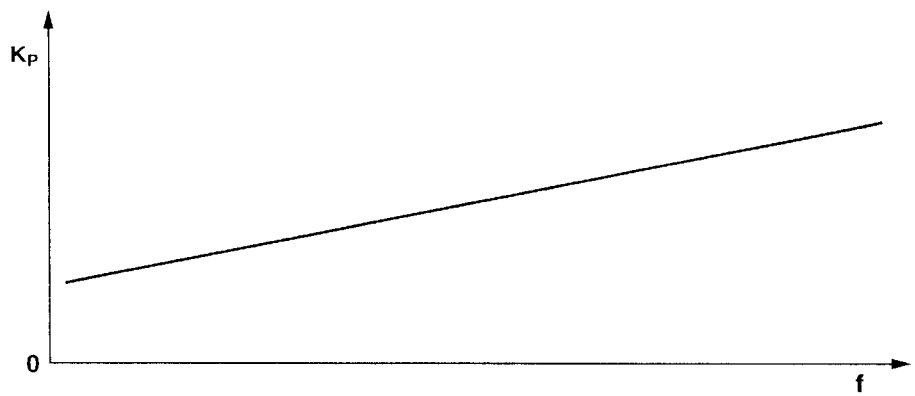
FIG. 8A is a graphical representation of a proportional gain ($K_P$) versus factor of proportionality (f) characteristic.
Figure 8B:
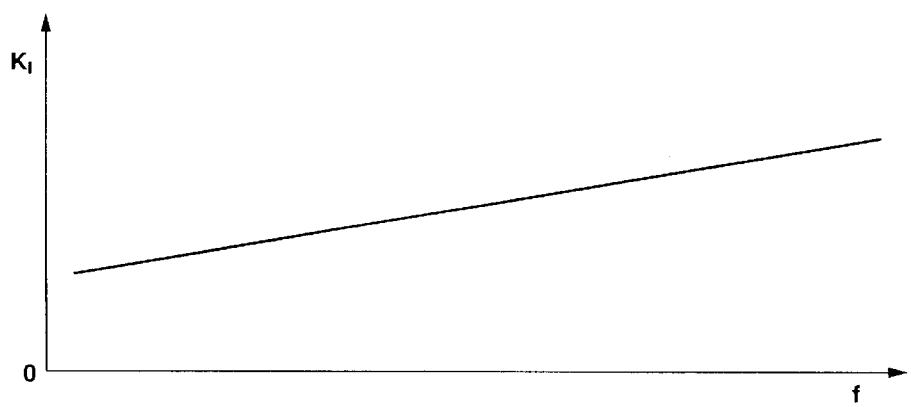
FIG. 8B is a graphical representation of an integral gain ($K_I$) versus factor of proportionality (f) characteristic.

In the embodiment, as shown in FIG. 8A, proportional gain $K_P$ is greater than 0 (zero) and proportional to factor of proportionality f, and, as shown in FIG. 8B, integral gain $K_I$ is greater than 0 (zero) and proportional to factor of proportionality f.

In addition to the PI controller 240, a D controller 246 is provided. An estimated value $y_m$ of trunnion axial displacement y on line 248 is used as an input to D controller 246. D controller 246 processes the trunnion axial displacement estimated value $y_m$ and outputs a D motor steps command $U_D$ on line 250. Rather than measuring the trunnion axial displacement y, a state observer 252 makes the estimation by processing actual trunnion angular position signal ϕ on line 242, output shaft speed $\omega_o$ on line 224, and actuator command indicative of motor steps u on line 228.

In one embodiment of the present invention, D controller 246 carries out the control action, which may be expressed as $$u_D = K_D y_m \qquad (11)$$

where:
$u_D$ is the damping motor steps, $K_D$ is the damping (D) gain, and $y_m$ is the estimated value of trunnion axial displacement y.

Figure 8C:
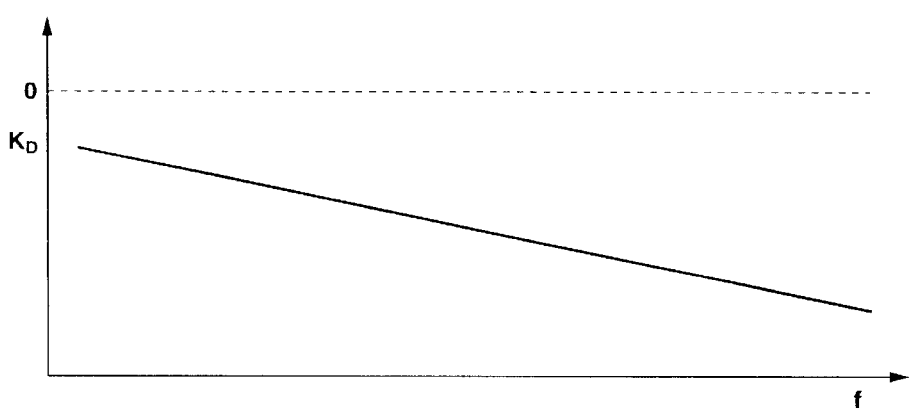
FIG. 8C is a graphical representation of a D gain versus factor of proportionality (f) characteristic.

In the embodiment, as shown in FIG. 8C, D gain $K_D$ is less than 0 (zero) and inversely proportional to the factor of proportionality f.

Assuming now that the estimated value $y_m$ is accurate enough to approximate the actual trunnion axial displacement y, the equation (3) may be rewritten as $$d\phi_m = f y_m \qquad (12)$$

where:
$d\phi_m$ is the estimated value of the first time derivative dϕ that is the physical quantity indicative of the ratio rate.

Consider now a derivative control action in which the output is proportional to the first time derivative of the input. Let us assume that the damping motor steps $u_D$ is the output and the trunnion angular position ϕ is the input. Then, the derivative control action may be expressed as $$u_D = c d\phi \qquad (13)$$

where:
c is the coefficient (c<0).

As the first time derivative dϕ of trunnion angular position is not measurable, it is approximated by the estimated value $d\phi_m$. Thus, we obtain $$u_D = c d\phi_m \qquad (14).$$

Using the equations (12) and (14), we obtain $$u_D = c f y_m \qquad (15).$$

Comparing the equation (15) to the equation (11), we obtain $$K_D = c f \qquad (16).$$

From the preceding description, it is noted that the D gain $K_D$ is the differential gain. With reference to FIG. 8C, it is noted that the coefficient c is the gradient of the illustrated D gain vs., factor of proportionality characteristic.

With continuing reference to FIG. 4, at a summation point 254, feedforward motor steps command $u_{FF}$ on line 238, PI motor steps command $u_{PI}$ on line 244, and D motor steps command $u_D$ are processed to give commanded motor steps u indicated by actuator command on line 228. The action at the summation point 254 may be expressed as $$u = u_{FF} + u_{PI} + u_D \qquad (17).$$

This equation (17) clearly states that D motor steps command $u_D$, which is less than 0 (zero), acts as a damping component of the commanded motor steps u. As will be appreciated by one ordinary skill in the art, the provision of such damping component permits controller designers to choose sufficiently large proportional and integral gains $K_P$ and $K_I$ as desired.

Figure 9:
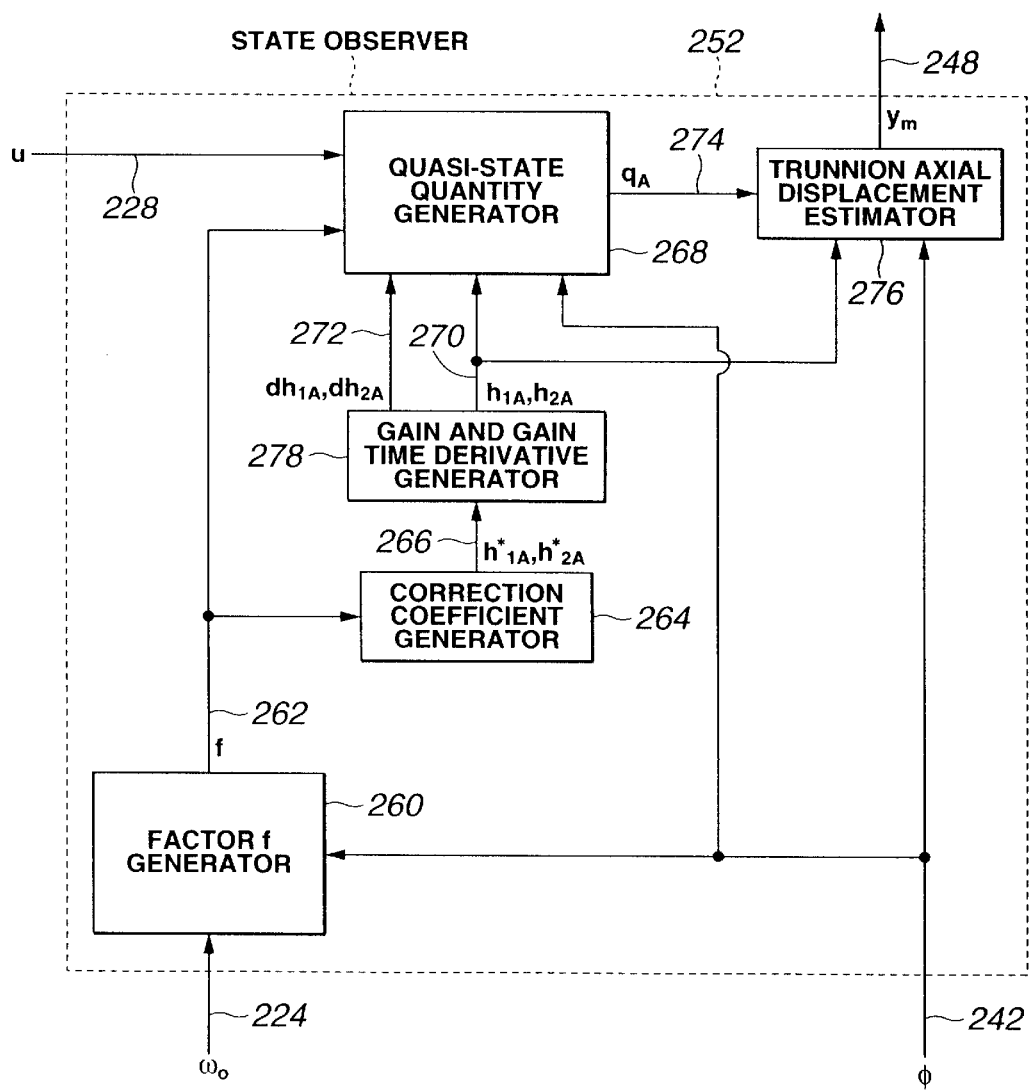
FIG. 9 is a control diagram of a state observer according to the present invention.

An exemplary implementation of the present invention can be understood with reference to the control diagram of FIG. 9. State observer 252 receives actuator command indicative of commanded motor steps u, trunnion angular position signal ϕ, and output shaft speed signal $\omega_o$, and processes them to give an estimated value $y_m$ of trunnion axial displacement y.

Before making further description on the manner of giving the estimated value $y_m$ of trunnion axial displacement y, we have to remember that the characteristic equation (5) expresses the mathematical model the system including the toroidal drive 12. The system state quantity $x_A$ of the characteristic equation (5) is a matrix including, as matrix elements, the trunnion axial displacement y and the trunnion angular position ϕ. To estimate the system state quantity $x_A$, we now consider the mathematical model of a state observer. The mathematical model of state observer may be expressed as $$dx_{Ae} = A_A x_{Ae} + B_A u + H_A (d\phi - d\phi_m) \qquad (18)$$

where:
$x_{Ae}$ is the estimated quantity of the system state quantity $x_A$ and the state quantity of the characteristic equation (18); u is the commanded motor steps and the input; ϕ is the trunnion angular position and the other input; $A_A$, $B_A$ and $H_A$ are coefficients in the form of matrices that specify the system; dϕ is the first time derivative of the trunnion angular position ϕ; $d\phi_m$ is the estimated value of the first time derivative dϕ; and $H_A$ is the coefficient called observer gain, $$x_{Ae} = \begin{bmatrix} \phi_m \\ y_m \end{bmatrix}$$

$$d\phi = C_A x_A, \; d\phi_m = C_A x_{Ae}$$

$$C_A = [0 \; f]$$

$$H_A = \begin{bmatrix} h_{1A} \\ h_{2A} \end{bmatrix}.$$

In the above equation (18), the first time derivative dϕ of trunnion angular position ϕ is not directly measurable, a state change is made as explained below $$x_{Ae} = q_A + H_A \phi \qquad (19)$$

where:
ϕ is the input, $x_{Ae}$ is the output, $q_A$ is the quasi-state quantity, and $H_A$ is the observer gain, $$q_A = \begin{bmatrix} q_{1A} \\ q_{2A} \end{bmatrix}.$$

Using the equation (18) and the equation (19) as modified by differentiating both sides of the latter, we obtain $$dq_A = dx_{Ae} - dH_A\phi - H_A d\phi \quad (20)$$
$$= A_A x_{Ae} + B_A u + H_A(d\phi - d\phi_m) - dH_A\phi - H_A d\phi$$
$$= A_A q_A + A_A H_A \phi + B_A u + H_A d\phi - H_A C_A x_{Ae} - dH_A \phi - H_A d\phi$$
$$= A_A q_A + A_A H_A \phi + B_A u - H_A C_A q_A - H_A C_A H_A \phi - dH_A \phi$$
$$= (A_A - H_A C_A) q_A + B_A u + (A_A H_A - H_A C_A H_A - dH_A)\phi$$

From the equation (20), we establish a filter, which is a characteristic function of the quasi-state quantity $q_A$. The filter is expressed as $$dq_A = A_{obA} q_A + D_A \phi + B_A u \quad (21)$$

where:

$q_A$ is the state quantity, u and $\phi$ are the inputs, $A_{obA}$ is the transition coefficient in the form of a transition matrix, and $D_A$ is the coefficient in the form of a matrix, $$A_{obA} = A_A - H_A C_A = \begin{bmatrix} 0 & f(1 - h_{1A}) \\ -a_1 & -a_2 - h_{2A} f \end{bmatrix}$$

$$D_A = A_A H_A - H_A C_A H_A - dH_A.$$

The filter as expressed by equation (21) is used to compute or estimate quasi-state quantity $q_A$. From the preceding description, it is to be noted that the mathematical model expressed by equation (18) has been manipulated into the form as expressed by equations (21) and (19).

In order to compute estimated quantity $x_{Ae}$ that is the state quantity of equation (18), the state observer 252 uses the above-mentioned filter (21) to give the first time derivative $dq_A$ of quasi-state quantity $q_A$. The first time derivative $dq_A$ is integrated to give quasi-state quantity $q_A$, which is then put into the equation (19) to give the estimated quantity $x_{Ae}$ of system state quantity $x_A$. As it is one of two matrix elements of the estimated quantity $x_{Ae}$, estimated value $y_m$ of trunnion axial displacement y is given after calculation of equations (21) and (19).

With reference now to FIG. 9, state observer 252 according to one exemplary embodiment of the present invention will be described. Output shaft speed signal $\omega_o$ on line 224 and trunnion angular position signal $\phi$ on line 242 are used as inputs to a factor of proportionality f generator 260. Factor of proportionality generator 260 calculates equation (4) and outputs factor of proportionality f on line 262. Factor of proportionality f on line 262 is used as an input to a correction coefficient generator 264, which outputs correction coefficients $h_{1A}*$ and $h_{2A}*$ on line 266. As will be understood as discussion proceeds, correction coefficients $h_{1A}*$ and $h_{2A}*$ will work to keep transition coefficient $A_{obA}$ of filter (21) unaltered. To determine such correction coefficients $h_{1A}*$ and $h_{2A}*$, the generator 264 calculates the equations as follows $$h_{1A}^* = 1 - \frac{k_{1A}}{f} \quad (22\text{-}1)$$

$$h_{2A}^* = -\frac{k_{2A} + a_2}{f} \quad (22\text{-}2)$$

where:

$k_{1A}$ and $k_{2A}$ are coefficients that determine speed at which state observer 252 makes the estimation. Correction coefficients $h_{1A}*$ and $h_{2A}*$ will be further described later.

Factor of proportionality f on line 262 is used as one input to a quasi-state quantity generator 268. Actuator command on line 228 indicative of motor steps u is used as another input to generator 268. Trunnion angular position signal $\phi$ on line 242 is used as still another input to generator 268. Observer gain matrix $H_A$, which includes observer gains $h_{1A}$ and $h_{2A}$, on line 270 and observer gain first time derivative matrix $dH_A$, which includes observer gain first time derivatives $dh_{1A}$ and $dh_{2A}$, on line 272 are used as the other inputs to generator 268. Using them, generator 268 calculates equation (21) to determine quasi-state quantity $q_A$. Generator 268 outputs quasi-state quantity $q_A$ on line 274.

Quasi-state quantity $q_A$ on line 274 is used as one input to a trunnion axial displacement estimator 276. Trunnion angular position signal $\phi$ on line 242 is used as another input to estimator 276. Observer gain $H_A$ on line 270 is used as the other input to estimator 276. Estimator 276 calculates equation (19) to give estimated quantity $x_{Ae}$ of system state quantity $x_A$. Estimated quantity $x_{Ae}$ includes, as one of its matrix elements, estimated value $y_m$ of trunnion angular displacement y. Estimator 276 outputs the estimated value $y_m$ on line 248.

The before-mentioned correction coefficients $h_{1A}*$ and $h_{2A}*$ will now be described in relation to transition matrix $A_{obA}$. Correction coefficients $h_{1A}*$ and $h_{2A}*$ on line 266 are used as inputs to a gain and gain time derivative generator 278. Generator 278 outputs observer gains $h_{1A}$ and $h_{2A}$ on line 270, and observer gain first time derivatives $dh_{1A}$ and $dh_{2A}$ on line 272.

In one embodiment of the present invention, generator 278 uses correction coefficients $h_{1A}*$ and $h_{2A}*$ as observer gains $h_{1A}$ and $h_{2A}$, respectively. Instead of differential operation on observer gains $h_{1A}$ and $h_{2A}$, generator 278 uses a pseudo-differentiator to give the first time derivatives $dh_{1A}$ and $dh_{2A}$ thereof. Using correction coefficients $h_{1A}*$ and $h_{2A}*$ as observer gains $h_{1A}$ and $h_{2A}$, respectively, the transition matrix $A_{obA}$ is kept unaltered as shown below $$A_{obA} = \begin{bmatrix} 0 & k_{1A} \\ -a_1 & k_{2A} \end{bmatrix}. \quad (23)$$

Using eigenvalue $\omega_{ob}$ of state observer 252, the matrix elements $k_{1A}$ and $k_{2A}$ of transition coefficient $A_{obA}$ are expressed as $$k_{1A} = \frac{\omega_{ob}^2}{a_1} \quad (24\text{-}1)$$

$$k_{2A} = -2\omega_{ob}. \quad (24\text{-}2)$$

Rewriting the matrix elements of equation (23) using equations (24-1) and (24-2), we obtain $-\omega_{ob}, -\omega_{ob}$ as eigenvalue of transition matrix $A_{obA}$ of equation (21).

Consider now an error $e_{obA}$ between the systeml state quantity $x_A$ of equation (5) and the estimated quantity $x_{Ae}$ given by the state observer 252. The error $e_{obA}$ is given as $$e_{obA} = x_A - x_{Ae} \quad (25).$$

Subtracting the equation (18) from equation (5) gives the relationship as $$dx_A - dx_{Ae} = A_A(x_A - x_{Ae}) - H_A C_A(x_A - x_{Ae}) \quad (26\text{-}1)$$

Using the relationship expressed by equation (25), equation (26-1) may be written as $$de_{obA} = (A_A - H_A C_A) e_{obA} \quad (26\text{-}2).$$

As transition matrix $A_{obA}$ is $(A_A - H_A C_A)$, equation (26-2) may be written as $$de_{obA} = A_{obA} e_{obA} \qquad (26\text{-}3),$$

As the eigenvalue of transition matrix $A_{obA}$ is $-\omega_{ob}$, $-\omega_{ob}$, the equation (26-3) clearly states that the error $e_{obA}$ will converge to zero with linear response exhibiting a certain time constant provided by the eigenvalue $-\omega_{ob}$, $-\omega_{ob}$.

With reference again to the gain and gain time derivative generator 278 shown in FIG. 9, in the embodiment, correction coefficients $h_{1A}*$ and $h_{2A}*$ on line 266 are used as observer gains $h_{1A}$ and $h_{2A}$.

In another exemplary embodiment of the present invention, corrected coefficients $h_{1A}*$ and $h_{2A}*$ are not equal to observer gains $h_{1A}$ and $h_{2A}$, respectively. Instead, they are used as inputs to low pass filters, respectively, of a gain and gain time derivative generator 278. The low pass filters are expressed as $$dh_{1A} = -a_{01} h_{1A} + a_{01} h_{1A}^* \qquad (27\text{-}1)$$

$$dh_{2A} = -a_{02} h_{2A} + a_{02} h_{2A}^* \qquad (27\text{-}2)$$

where:

$a_{01}$ and $a_{02}$ are the filter coefficients, respectively.

In this embodiment, integrating low pass filters (27-1) and (27-2) outputs observer gains $h_{1A}$ and $h_{2A}$, respectively, on line 270. Gain and gain time derivative generator 278 use outputs of filters (27-1) and (27-2), which may be regarded as mid values for calculation of observer gains, as the first time derivatives $h_{1A}$, $dh_{2A}$ of observer gains $h_{1A}$, $h_{2A}$.

In the embodiment employing low pass filters, observer gains $h_{1A}$ and $h_{2A}$ are not completely equal to correction coefficients $h_{1A}*$ and $h_{2A}*$, respectively, because each of the observer gains is given by multiplying the corresponding one of the correction coefficients with the associated low pass filter. This indicates that transition coefficient $A_{obA}$ is not completely unaltered. However, in the embodiment, transition coefficient $A_{obA}$ is kept substantially unaltered by selecting filter coefficients $a_{01}$ and $a_{02}$ to sufficiently large enough to reduce a deviation of each of observer gains $h_{1A}$ and $h_{2A}$ from the associated one of correction coefficients $h_{1A}*$ and $h_{2A}*$ toward zero.

Employing low pass filters (27-1) and (27-2) is advantageous in suppressing error between $y_m$ and $y$ caused due to noise because differential operation is no longer needed. As is well known by one of ordinary skill in the art, differential calculation is considered to amplify noise if it is included in the output of a sensor.

In the embodiment, factor of proportionality f and observer gain $H_A$ may include noise of the above kind. Factor of proportionality f includes trunnion angular position signal $\phi$ and output shaft speed signal $\omega_o$, which are outputted by the encoder and speed sensor, respectively. The factor of proportionality f is used to correct observer gain $H_A$. Thus, inclusion of noise into observer gain $H_A$ inevitably takes place. In the case where observer gain $H_A$ is subject to differential operation, the amplification of such noise is unavoidable, making it difficult to tell the time derivative component out of the noise component.

An example of how a controller, such as the T-CVT controller 210 (see FIG. 3), would implement the present invention can be understood with reference to FIGS. 10–15. The flow diagrams in FIGS. 10–15 illustrate a main routine and the associated sub routines of one exemplary implementation of the present invention. As will be appreciated by one of ordinary skill in the art, the steps illustrated with respect to FIGS. 10–15 are preferably repeated at predetermined intervals, such as 10 milliseconds, for example. Further, the steps illustrated with respect to FIGS. 10–15 are preferably stored in computer readable storage media 214 (see FIG. 3). Computer readable storage media 214 have data stored thereon representing instructions executable by T-CVT controller 210 to control toroidal drive 12 in a manner illustrated with respect to FIGS. 10–15.

Figure 10:
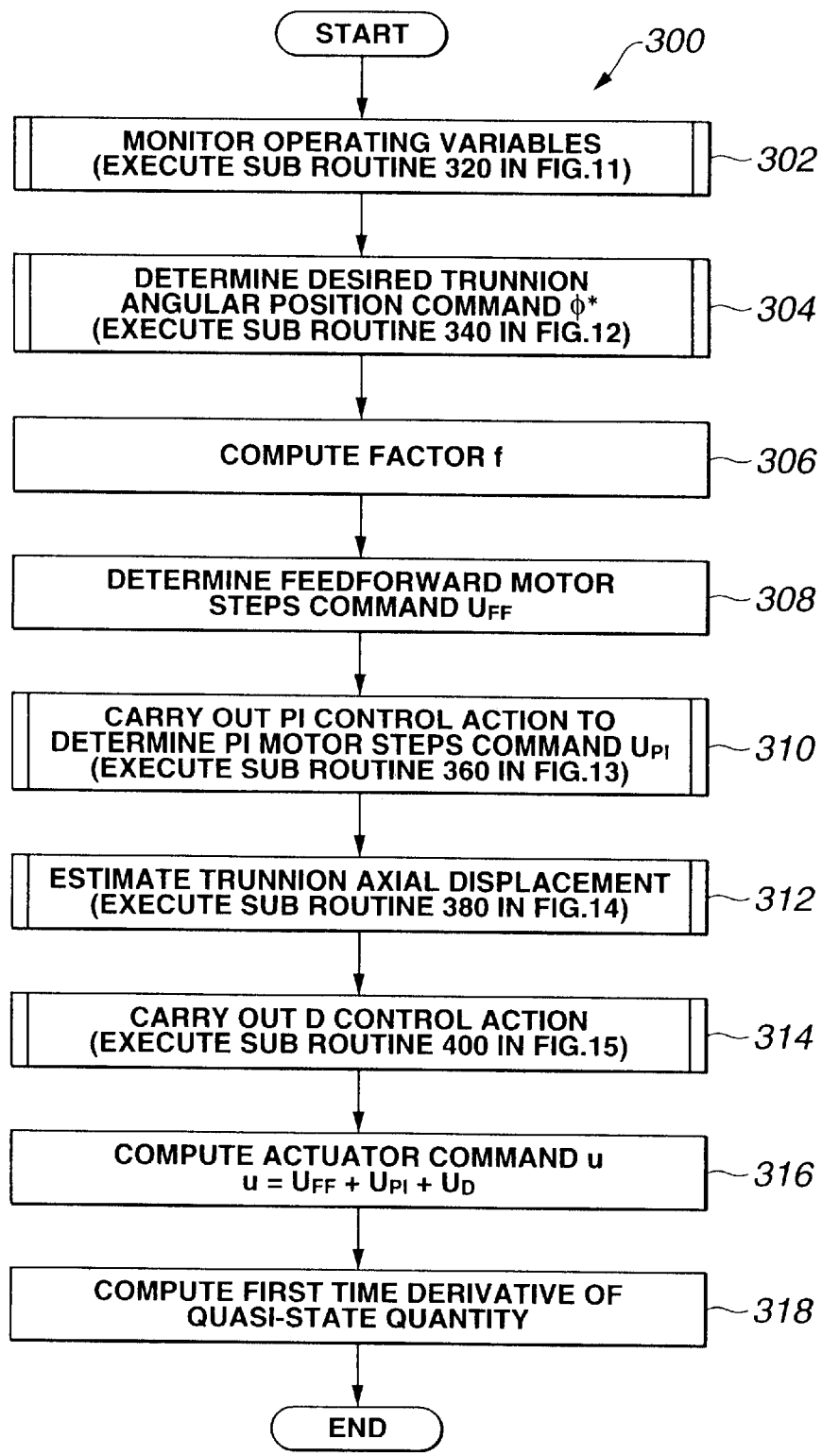
FIGS. 10 to 15 are flow diagrams implementing the present invention.

In FIG. 10, the main routine is generally designated by the reference numeral 300.

Figure 11:
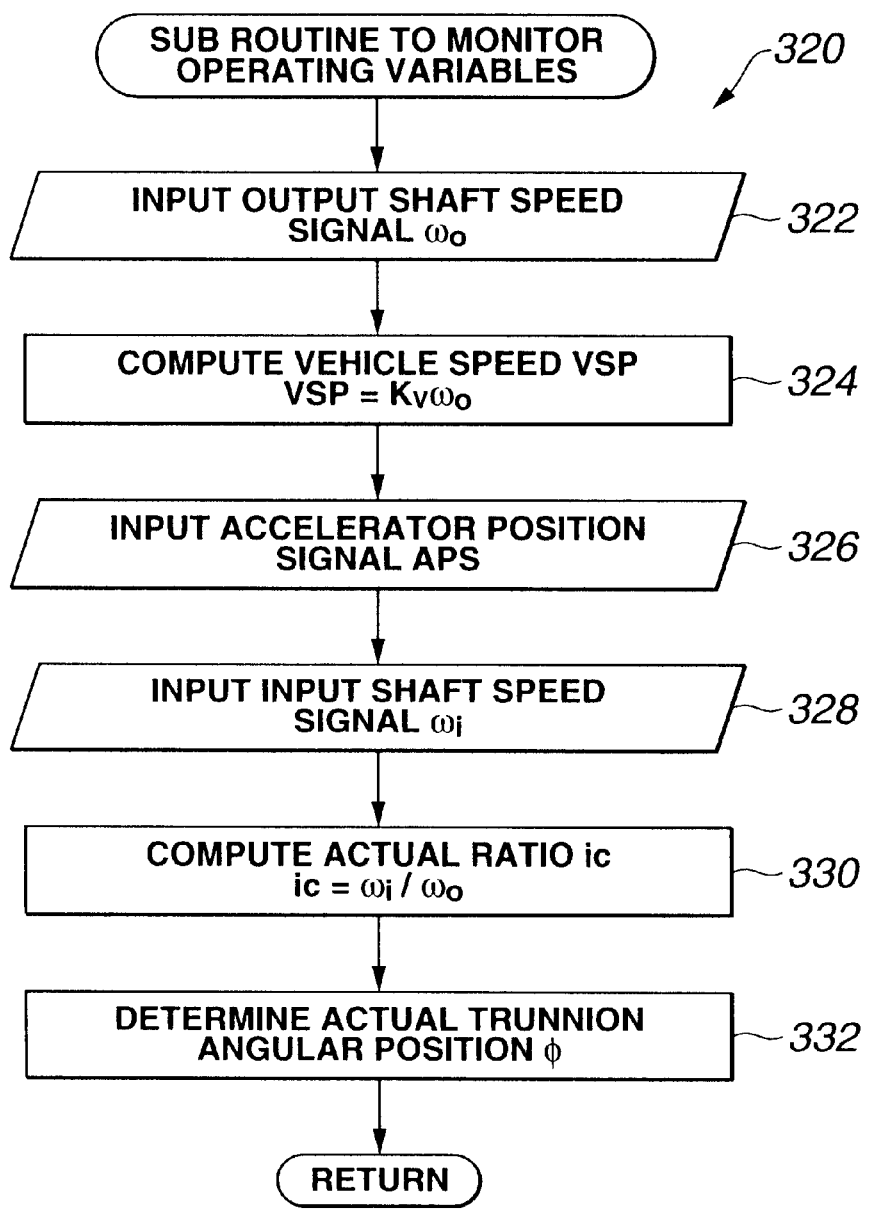

In step 302, the controller executes a sub routine 320 in FIG. 11 to monitor operating variables indicative of output shaft speed $\omega_o$, vehicle speed VSP, accelerator pedal position APS, input shaft speed $\omega_i$, actual speed ratio $i_c$ and actual trunnion angular position $\phi$.

Figure 12:
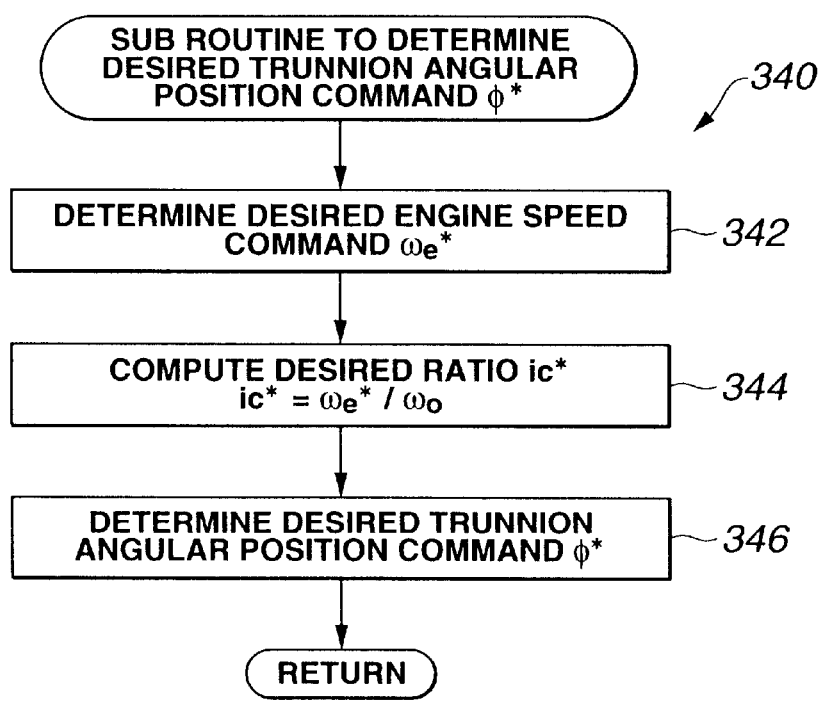

In step 304, the controller executes a sub routine 340 in FIG. 12 to determine desired trunnion angular position command $\phi^*$.

In step 306, the controller computes factor of proportionality f that is expressed by equation (4).

In step 308, the controller determines feedforward motor steps command $u_{FF}$ by referring to the illustrated relationship in FIG. 7 against the desired trunnion angular position $\phi^*$, which has been determined in step 304.

Figure 13:
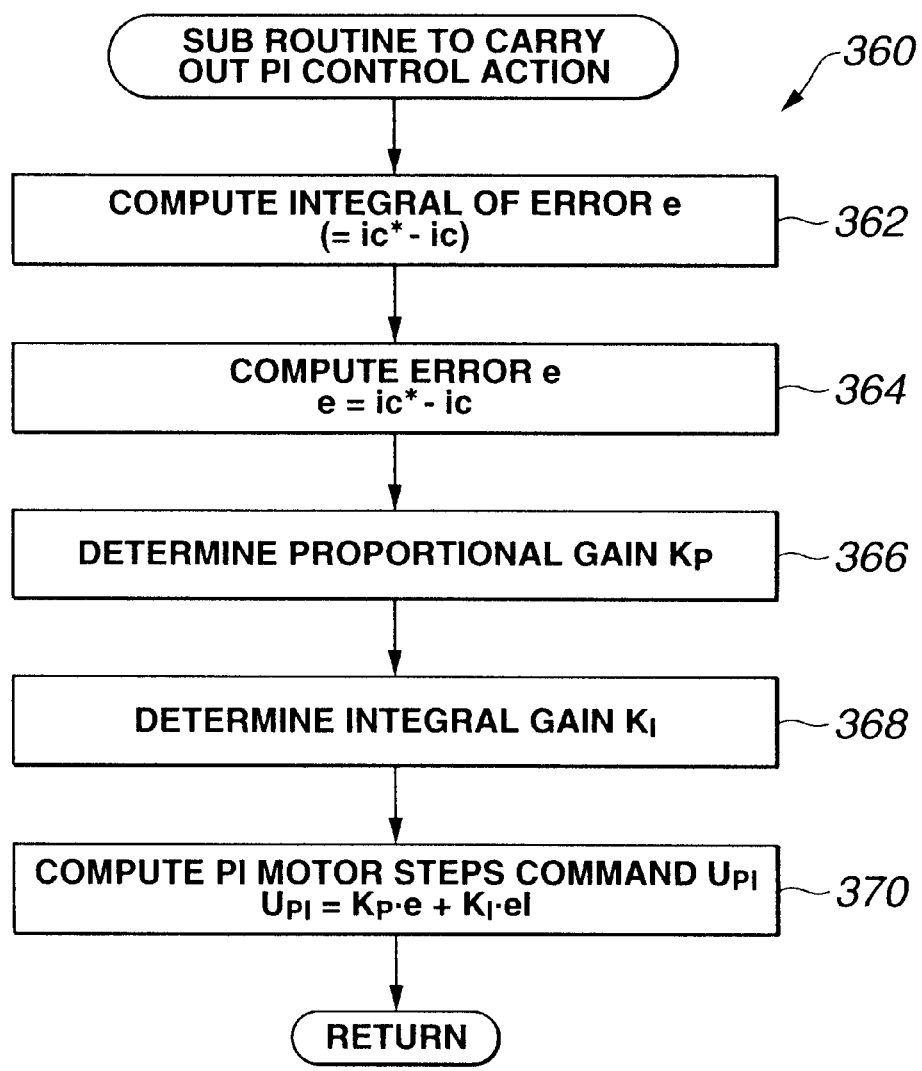

In step 310, the controller executes a sub routine 360 in FIG. 13 to carry out PI (proportional and integral) control action to determine PI (or feedback) motor steps command $u_{PI}$.

Figure 14:
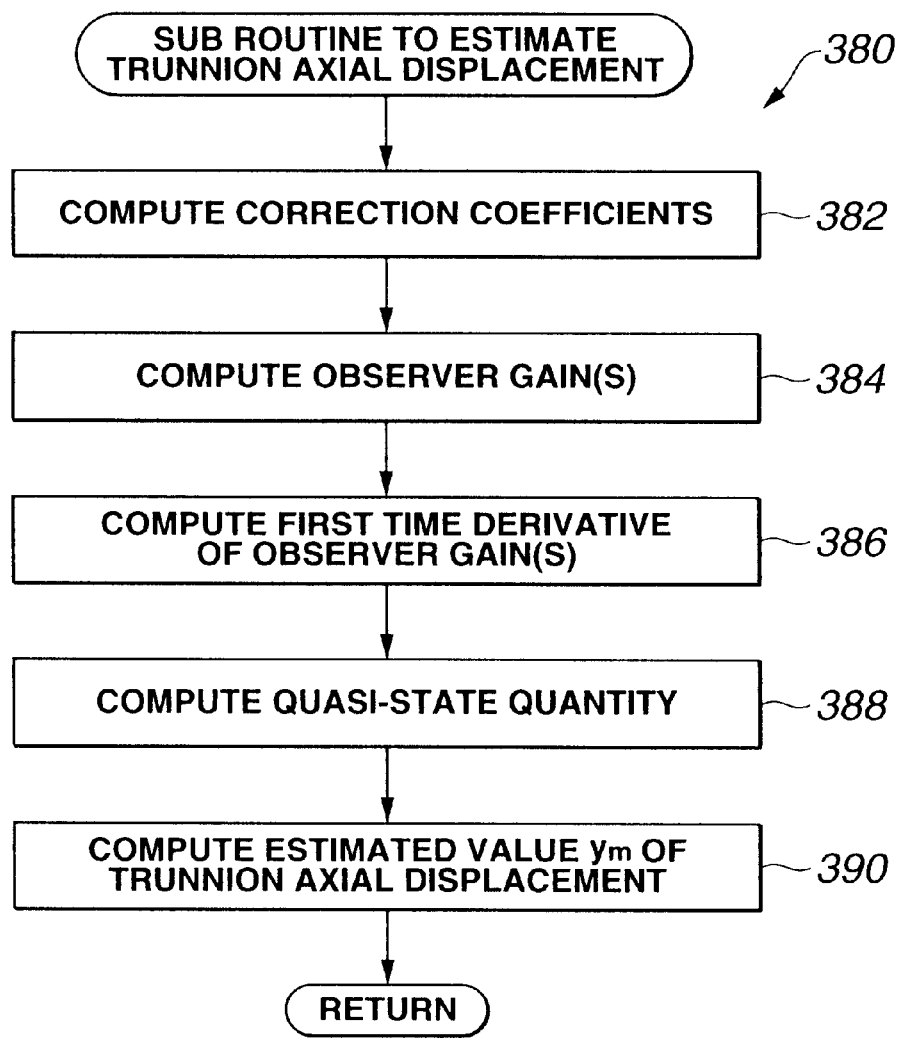

In step 312, the controller executes a sub routine 380 in FIG. 14 to estimate trunnion axial displacement y, giving an estimated value $y_m$ thereof.

Figure 15:
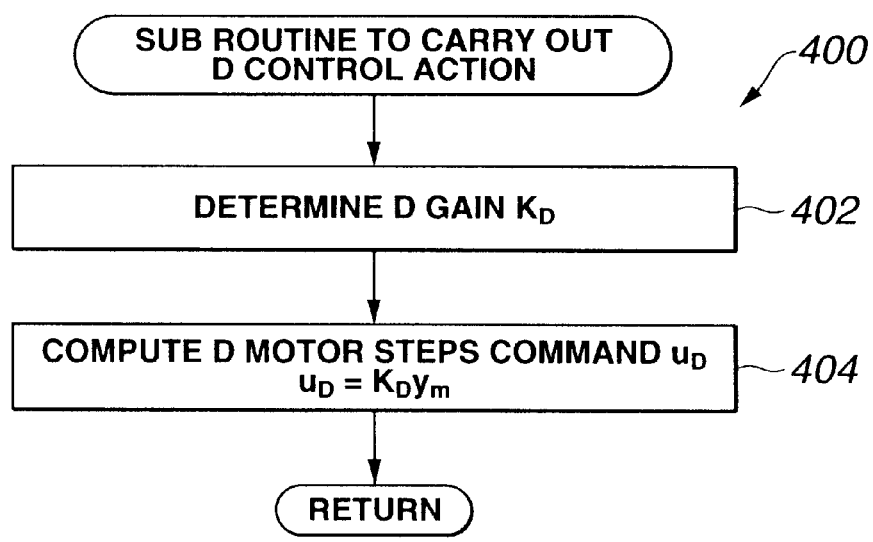

In step 314, the controller executes a sub routine 400 in FIG. 15 to carry out D control action to determine D motor steps command $u_D$.

In step 316, the controller combines in appropriate manner the feedforward motor steps command $u_{FF}$, PI or feedback motor steps command $u_{PI}$ and D motor steps command $u_D$ to determine actuator command, in the form of motor steps, u by, for example, using equation (17).

In step 318, the controller computes the first time derivative $dq_A$ of quasi-state quantity $q_A$, which is expressed as $$dq_A = \begin{bmatrix} dq_{1A} \\ dq_{2A} \end{bmatrix} = \begin{bmatrix} 0 & f(1-h_{1A}) \\ -a_1 & -a_2 - h_{2A} f \end{bmatrix} \begin{bmatrix} q_{1A} \\ q_{2A} \end{bmatrix} + \qquad (28)$$

$$\begin{bmatrix} fh_{2A} - h_{1A} fh_{2A} - dh_{1A} \\ -a_1 h_{1A} - a_2 h_{2A} - fh_{2A}^2 - dh_{2A} \end{bmatrix} \phi + \begin{bmatrix} 0 \\ b \end{bmatrix} u.$$

In equation (28), it is noted that the matrix $$\begin{bmatrix} 0 & f(1-h_{1A}) \\ -a_1 & -a_2 - h_{2A} f \end{bmatrix}$$

is transition coefficient $A_{obA}$ used in equation (21). Transition coefficient $A_{obA}$ is kept unaltered if the correction coefficients $h_{1A}*$ and $h_{2A}*$, see equations (22-1) and (22-2), are used as observer gains $h_{1A}$ and $h_{2A}$. In this matrix, using the correction coefficients $h_{1A}*$ and $h_{2A}*$, for example, as observer gains $h_{1A}$ and $h_{2A}$, equation (28) may be written as $$\begin{bmatrix} dq_{1A} \\ dq_{2A} \end{bmatrix} = \begin{bmatrix} 0 & \dfrac{\omega_{ob}^2}{a_1} \\ -a_1 & -2\omega_{ob} \end{bmatrix} \begin{bmatrix} q_{1A} \\ q_{2A} \end{bmatrix} + \begin{bmatrix} fh_{2A} - h_{1A}fh_{2A} - dh_{1A} \\ -a_1 h_{1A} - a_2 h_{2A} - fh_{2A}^2 - dh_{2A} \end{bmatrix} \phi + \begin{bmatrix} 0 \\ b \end{bmatrix} u. \quad (29)$$

In the embodiment, for simplicity of mathematical operation, the controller uses equation (29) instead of equation (28) to give the first time derivatives $dq_{1A}$ and $dq_{2A}$.

Referring to FIG. 11, the sub routine 320 to monitor operating variables is now described. As mentioned above, this sub routine is executed in step 302 in FIG. 10.

In step 322, the controller inputs information of output shaft speed by receiving output shaft speed signal $\omega_o$ from sensor 204 (see FIG. 1).

In step 324, the controller computes vehicle speed VSP using the output shaft speed by calculating equation (6).

In step 326, the controller inputs information of accelerator pedal position by receiving accelerator pedal position signal APS from encoder associated with the vehicle accelerator pedal.

In step 328, the controller inputs information of input shaft speed by receiving input shaft speed signal $\omega_i$ from sensor 202 (see FIG. 1).

In step 330, the controller computers actual speed ratio ic that is expressed by equation (8).

In step 332, the controller inputs information of actual trunnion angular position by receiving actual trunnion angular position signal $\phi$ from the encoder arranged around trunnion 100 (see FIG. 2). If the provision of such encoder is discouraged, actual trunnion angular position $\phi$ may be obtained by using the actual ratio ic determined in step 330 in retrieving the illustrated relationship in FIG. 6.

Referring to FIG. 12, the sub routine 340 to determine desired trunnion angular position command $\phi^*$ is now described. This sub routine is executed in step 304 in FIG. 10.

In step 342, the controller determines desired engine speed command $\omega_o$ by looking into the illustrated data in FIG. 5, each being indexed by vehicle speed VSP and accelerator pedal position APS.

In step 344, the controller computes desired speed ratio ic*, which is expressed by equation (7).

In step 346, the controller determines desired trunnion angular position command $\phi^*$ by looking into the illustrated data in FIG. 6, each being indexed by desired ratio command ic*.

Referring to FIG. 13, the sub routine 360 to carry out PI control action is now described. This sub routine is executed in step 310 in FIG. 10.

In step 362, the controller computes the time integral eI of an error e (e=ic*−ic) by calculating the following formula.

$$eI \leftarrow eI + Te \quad (30)$$

where:

T represents a period of time of each of the predetermined intervals at which the steps illustrated in FIGS. 10–15 are executed and is equal to 0.01, indicative of 10 milliseconds.

As will be noted by one of ordinary skill in the art, the error e that was computed during the previous execution by the controller is used in calculating equation (30) in step 362.

In step 364, the controller computes error e between the desired ratio ic* (determined in step 344 during the current execution) and the actual ratio ic (determined in step 330 during the current execution). In the embodiment, error e is expressed as $$e = ic^* - ic \quad (31).$$

In step 366, the controller determines a proportional gain $K_P$ against factor of proportionality f computed in step 306 using the illustrated relationship in FIG. 8A.

In step 368, the controller determines an integral gain $K_I$ against factor of proportionality f computed in step 306 using the illustrated relationship in FIG. 8B.

In step 370, the controller computes PI motor steps command $u_{PI}$ by calculating the equation as follows $$u_{PI} = K_p e + K_I eI \quad (32).$$

Referring to FIG. 14, the sub routine 380 to estimate trunnion axial displacement is now described. This sub routine is executed in step 312 in FIG. 10.

In step 382, the controller computes correction coefficients $h_{1A}^*$ and $h_{2A}^*$. Using equations (24-1), (24-2), (22-1) and (22-2), the correction coefficients $h_{1A}^*$ and $h_{2A}^*$ are given as $$h_{1A^*} = 1 - \dfrac{\omega_{ob}^2}{a_1 f} \quad (33\text{-}1)$$

$$h_{2A^*} = -\dfrac{2\omega_{ob} - a_2}{f}. \quad (33\text{-}2)$$

In step 382, the controller calculates the equations (33-1) and (33-2) using factor of proportionality f to give correction coefficients $h_{1A}^*$ and $h_{2A}^*$.

In step 384, the controller computes observer gains $h_{1A}$ and $h_{2A}$ by integrating the time derivatives of observer gains $dh_{1A}$ and $dh_{2A}$ that were obtained in step 318 in FIG. 10 during the last execution by the controller. To give observer gains $h_{1A}$ and $h_{2A}$, using the previously obtained values of $h_{1A}$, $h_{2A}$, $dh_{1A}$ and $dh_{2A}$, the controller calculates the following formulas $$h_{1A} \leftarrow h_{1A} + Tdh_{1A} \quad (34\text{-}1)$$

$$h_{2A} \leftarrow h_{2A} + Tdh_{2A} \quad (34\text{-}2).$$

In step 386, the controller computes the first time derivatives $dh_{1A}$ and $dh_{2A}$ of observer gains by calculating low pass filters expressed by equations (27-1) and (27-2) using corrected coefficients $h_{1A}^*$ and $h_{2A}^*$ that have been given in step 382 and observer gains $h_{1A}$ and $h_{2A}$ that have been given in step 384.

In step 388, the controller computes quasi-state quantity $q_{1A}$, $q_{2A}$ by integrating the first time derivatives $dq_{1A}$ and $dq_{2A}$ that were given in step 318 during the last cycle of execution. To give quasi-state quantities $q_{1A}$ and $q_{2A}$, using the previously obtained values $q_{1A}$, $q_{2A}$, $dq_{1A}$ and $dq_{2A}$, the controller calculates the following formulas $$q_{1A} \leftarrow q_{1A} + Tdq_{1A} \quad (35\text{-}1)$$

$$q_{2A} \leftarrow q_{2A} + Tdq_{2A} \quad (35\text{-}2).$$

In step 390, the controller computes estimated value $y_m$ of trunnion axial displacement y. To give estimated value $y_m$, using quasi-state quantity $q_{2A}$, actual trunnion angular position φ, and observer gain $h_{2A}$, the controller calculates the equation as follows $$y_m = q_{2A} + h_{2A}\phi \tag{36}$$

Referring to FIG. 15, the sub routine 400 to carry out D control action is now described. This sub routine is executed in step 314 in FIG. 10.

In step 402, the controller determines a D gain $K_D$ against factor of proportionality f computed in step 306 using the illustrated relationship in FIG. 8C.

In step 404, the controller computes D motor steps command $u_D$ by calculating equation (11).

With reference again to FIG. 9, generator 268 of state observer 252 calculates the filter expressed by equation (21) to give the first time derivative $dq_A$ of quasi-state quantity $q_A$. The first time derivative $dq_A$ is integrated to give quasi-state quantity $q_A$, which is then put into equation (19) to give estimated quantity $x_{Ae}$ of system state quantity $x_A$. Estimator 276 calculates equation (19). State quantity $x_A$ contains, as its matrix elements, trunnion angular position φ as well as trunnion axial displacement y, making it possible for state observer 252 to give an estimated value $\phi_m$ of trunnion angular position φ as well.

In an exemplary embodiment where trunnion angular position φ is measurable, a low order state observer may replace such a high order state observer as expressed by equations (21) and (19). The mathematical model of a lower order state observer is manipulated into the form expressed as $$dq_r = (-a_2 - h_r f)q_r + (-a_1 - a_2 h_r - fh_r^2 - dh_r)\phi + bu \tag{37}$$

$$y_m = q_r + h_r \phi \tag{38}$$

where:

$q_r$ is the quasi-state quantity;

$h_r$ is the observer gain;

$(-a_2 - h_r f)$ is the transition coefficient.

In one embodiment of the present invention, equations (37) and (38) have replaced equations (21) and (19), respectively. This has brought about a drop, in the rank of state observer 252, from the second order to the first order.

In this embodiment, state observer 252 has an eigenvalue of $\omega_{ob}$. Thus, a correction coefficient $h_r^*$ is given as $$h_r^* = \frac{\omega_{ob} - a_2}{f}. \tag{39}$$

Using correction coefficient $h_r^*$ as the observer gain $h_r$, equation (37) may be written as $$dq_r = -\omega_{ob}q_r + (-a_1 - a_2 h_r^* - fh_r^{*2} - dh_r^*)\phi + bu \tag{40}$$

As the eigenvalue is $-\omega_{ob}$, an error $e_y$ between estimated value $y_m$ of trunnion axial displacement and actual value y thereof will diverge toward zero, exhibiting the dynamic characteristic as expressed as $$de_y + \omega_{ob} e_y = 0 \tag{41}$$

An example of how T-CVT controller 210, incorporating the low order state observer mentioned above, would implement the present invention can be understood with reference to FIGS. 10–15 only by listing alterations needed.

In FIG. 10, at step 318, the controller computes the first time derivative $dq_r$ of quasi-state quantity $q_r$ by calculating equation (40) instead of calculating equation (29).

In FIG. 14, at step 382, the controller gives correction coefficient $h_r^*$ by calculating equation (39) instead of calculating equations (33-1) and (33-2).

In FIG. 14, at step 384, instead of calculating formulas (34-1) and (34-2), the controller gives observer gain hr by calculating the following formula $$h_r \leftarrow h_r + Tdh_r \tag{42}$$

In FIG. 14, at step 386, instead of calculating equations (27-1) and (27-2), the controller gives the first time derivative $dh_r$ of observer gain by calculating the equation as follows $$dh_r = -ah_r + ah_r^* \tag{43}$$

In FIG. 14, at step 388, instead of calculating formulas (35-1) and (35-2), the controller gives quasi-state quantity $q_r$ by calculating the following formula $$q_r \leftarrow q_r + Tdq_r \tag{44}$$

In FIG. 14, at step 390, instead of calculating equation (36), the controller gives estimated value $y_m$ of trunnion axial displacement y by calculating equation (38).

Figure 16:
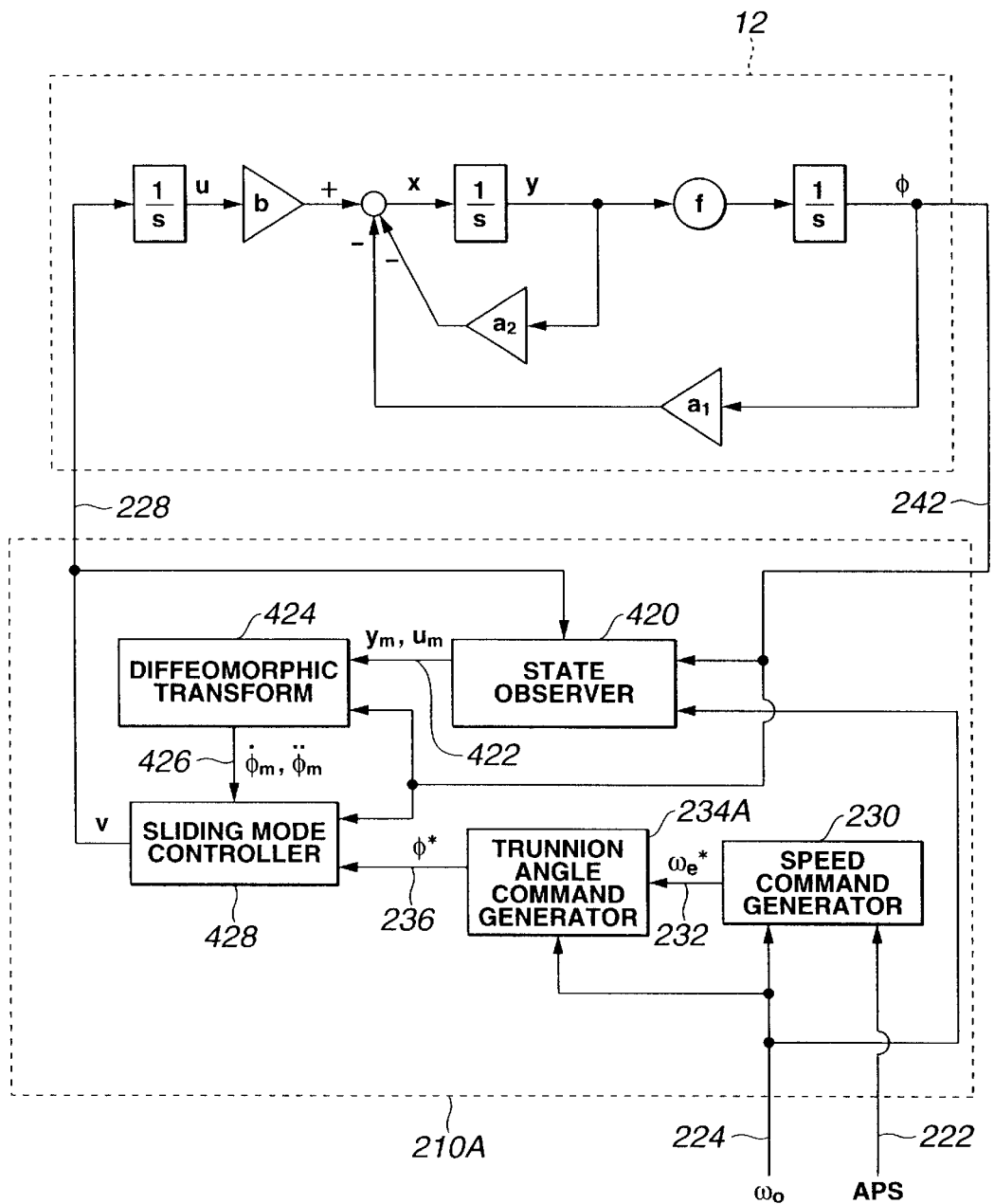
FIG. 16 is a control diagram of another T-CVT controller according to the present invention.

Another exemplary embodiment of the present invention can be understood with reference to control diagram shown in FIG. 16. In FIG. 16, motor steps rate or speed vindicated by actuator command on line 228 is used as a system input to toroidal drive 12. A trunnion angular position φ of traction roller assembly 108 about its pivot axis 104 is used as a system output.

In the embodiment, actuator 188 is in the form of a stepper motor. The stepper motor 188 can perform integral operation of motor steps rate v to provide motor steps u and move actuator shaft 190 in its axial direction in proportional relationship to the motor steps u.

Motor steps rate v and motor steps u have the following relationship $$du = v \tag{45}$$

where:

du is the first time derivative of motor steps u.

Similarly to equation (5), the dynamic characteristic of the system including the toroidal drive 12 may be expressed as $$dx_B = A_B x_B + B_B v \tag{46}$$

where:

v is the input, $x_B$ is the system state quantity and includes, as its matrix elements, trunnion angular position φ, trunnion axial displacement y and motor steps u, x is the displacement of the ratio control element, $C_B$ is a matrix by which φ and x are related, and $A_B$ and $B_B$ are matrices that specify the system including the toroidal drive 12

$$\phi = C_B x, \quad C_B = [1 \quad 0 \quad 0]$$

$$x_B = \begin{bmatrix} \phi \\ y \\ u \end{bmatrix}$$

-continued $$A_B = \begin{bmatrix} 0 & f & 0 \\ -a_1 & -a_2 & b \\ 0 & 0 & 0 \end{bmatrix}$$

$$B_B = \begin{bmatrix} 0 \\ 0 \\ 1 \end{bmatrix}.$$

With continuing reference to FIG. 16, a T-CVT controller 210A receives various signals, processes them to determine motor steps rate v, and generates an actuator command in the form of motor steps rate v on line 228. Controller 210A is similar to controller 210 in FIG. 4, so that like reference numerals are used to denote like component parts in FIGS. 4 and 16.

Controllers 210A and 210 have substantially the same speed command generators 230, each of which outputs a desired engine speed command $\omega_e^*$ on line 232. Besides, they have like trunnion angle command generators 234 and 234A.

In FIG. 16, desired engine speed command $\omega_e^*$ on line 232 is used as one of two inputs to a trunnion angle or angular position command generator 234A. Output shaft speed signal $\omega_o$ on line 224 is used as the other input to trunnion angle command generator 234A. Trunnion angle command generator 234A is substantially the same as trunnion angle command generator 234 in FIG. 4 and outputs a desired trunnion angular position command $\phi^*$ on line 236. But, trunnion angle command generator 234A is different from trunnion angle command generator 234 in that the former does not output a feedforward motor steps command $u_{FF}$.

However, controllers 210 and 210A are different from each other in the following respect. Controller 210A includes a state observer 420, a diffeomorphic transform 424 and a sliding mode controller 428, in the place of the component parts, such as state observer 232, D controller 246, PI controller and summation point 254, of controller 210.

In the embodiment illustrated in FIG. 16, motor steps rate v is used as actuator command applied to stepper motor 188 (see FIG. 2). In the embodiment, as actual trunnion angular position $\phi$ is directly measurable, state observer 420 is in the form of a low order state observer is used. The low order state observer gives an estimated value $y_m$ of trunnion axial displacement y and motor steps u.

In this case, a system state quantity w is considered, which includes, as its elements, trunnion axial displacement y and motor steps u. Using motor steps rate v and trunnion angular displacement $\phi$ as inputs, the mathematical model expressed by equation (46) may be simplified as $$dw = A_{22}w + B_2v + A_{21}\phi \tag{47}$$

where:

w is the state quantity, v and $\phi$ are the inputs, and $A_{22}$, $B_2$ and $A_{21}$ are the coefficients that specify the system $$w = \begin{bmatrix} y \\ u \end{bmatrix}$$

$$A_B = \begin{bmatrix} A_{11} & A_{12} \\ A_{21} & A_{22} \end{bmatrix}, A_{11} = 0, A_{12} = [f\ 0],$$

$$A_{21} = \begin{bmatrix} -a_1 \\ 0 \end{bmatrix}, A_{22} = \begin{bmatrix} -a_2 & b \\ 0 & 0 \end{bmatrix}$$

$$B_B = \begin{bmatrix} B_1 \\ B_2 \end{bmatrix}, B_1 = 0, B_2 = \begin{bmatrix} 0 \\ 1 \end{bmatrix}$$

To estimate system state quantity w, we now consider a state observer 420. The mathematical model of state observer 420 may be expressed as $$dW_e = A_{22}w_e + B_2v + A_{21}\phi + H_B(d\phi - d\phi_m) \tag{48}$$

where:

$w_e$ is the estimated quantity of system state quantity w, $y_m$ is the estimated value of trunnion axial displacement y, $u_m$ is the estimated value of motor steps, and $H_B$ is the observer gain and has the matrix elements $h_{1B}$ and $h_{2B}$ $$w_e = \begin{bmatrix} y_m \\ u_m \end{bmatrix}$$

$$d\phi = A_{12}w$$

$$d\phi_m = A_{12}w_e$$

$$H_B = \begin{bmatrix} h_{1B} \\ h_{2B} \end{bmatrix}.$$

As trunnion angular position $d\phi$ is not directly measurable, a state change is made as explained below $$w_e = q_B + H_B\phi \tag{49}$$

where:

$q_B$ is the quasi-state quantity $$q_B = \begin{bmatrix} q_{1B} \\ q_{2B} \end{bmatrix}.$$

Using the equation (48) and the equation (49) as modified by differentiating both sides of the latter, we obtain the equation as follows $$dq_B = dw_e - dH_B\phi - H_Bd\phi \tag{50}$$

$$= A_{22}w_e + B_2v + A_{21}\phi + H_B(d\phi - d\phi_m) - dH_B\phi - H_Bd\phi$$

$$= A_{22}q_B + A_{22}H_B\phi + B_2v + A_{21}\phi + H_Bd\phi -$$

$$H_BA_{12}w_e - dH_B\phi - H_Bd\phi$$

$$= A_{21}q_B + A_{22}H_B\phi + B_2v + A_{21}\phi - H_BA_{12}q_B -$$

$$H_BA_{12}H_B\phi - dH_B\phi$$

$$= (A_{22} - H_BA_{12})q_B + B_2v + (A_{21} + A_{22}H_B - H_BA_{12}H_B - dH_B)\phi$$

From the equation (50), we obtain a filter, i.e., a characteristic equation for quasi-state quantity $q_B$, expressed as $$dq_B = A_{obB}q_B + D_B\phi + B_2v \tag{51}$$

where:

v and $\phi$ are the inputs, $q_B$ is the state quantity, $A_{obB}$ is the transition coefficient, and $D_B$ and $B_2$ are the coefficients $$A_{odB} = A_{22} - H_B A_{12} = \begin{bmatrix} -a_2 - h_{1B}f & b \\ -h_{2B}f & 0 \end{bmatrix}$$

$D_B = A_{21} + A_{22}H_B - H_B A_{12} H_B - dH_B.$

In order to compute estimated quantity $w_e$, the state observer 420 calculates the filter (51) to give the first time derivative $dq_B$ of quasi-state quantity $q_B$. The first time derivative $dq_B$ is integrated to give quasi-state quantity $q_B$, which is then put into the equation (49) to give the estimated quantity $w_e$ of system state quantity w. As they are two matrix elements of the estimated quantity $w_e$, estimated value $y_m$ of trunnion axial displacement y and estimated value $u_m$ of motor steps u are given after calculation of equations (51) and (49). State observer 420 outputs estimated values $y_m$ and $u_m$ on line 422.

The estimated values $y_m$ and $u_m$ on line 422, and trunnion angular displacement $\phi$ on line 242 are used as inputs into diffeomorphic transform 424. Diffeomorphic transform 424 outputs an estimated value $d\phi_m$ ($=\dot{\phi}_m$) of the first time derivative (speed) of trunnion angular position $\phi$, and an estimated value of the second time derivative $\alpha\phi_m$ ($=\ddot{\phi}_m$) of trunnion angular position $\phi$ by calculating the equations as follows $$d\phi_m = \dot{\phi}_m = fy_m \qquad (52\text{-}1)$$

$$\alpha\phi_m = \ddot{\phi}_m = df y_m + f(bu_m - a_1\phi - a_2 y_m) \qquad (52\text{-}2)$$

In equation (52-2), df is the first time derivative of factor of proportionality f To give the first time derivative df, a pseudo-differentiator may be used. But, the first time derivative df may be given by calculating the equation as follows $$df = [\sin(c_{gl} - \phi)\{c_{g0} - \cos(2c_{gl} - \phi)\} - \sin(2c_{gl} - \phi)\cos(c_{gl} - \phi)] \frac{fy_{\omega 0}}{c_f} + \frac{\cos(c_{gl} - \phi)[c_{g0} - \cos(2c_{gl} - \phi)]}{c_f} d_{\omega 0}. \qquad (53)$$

In equation (53), the first time derivative $d\omega_o$ may be obtained by a pseudo-differentiator. However, the variation of output shaft speed signal $\omega_o$ is negligibly small due to inertia of the vehicle because output shaft 98 (see FIG. 1) is directly connected to the vehicle output shaft. Thus, $d\omega_o$ may be set equal to approximately 0. Setting $d\omega_o = 0$, equation (53) may be simplified as $$df = [\sin(c_{gl} - \phi)\{c_{g0} - \cos(2c_{gl} - \phi)\} - \sin(2c_{gl} - \phi)\cos(c_{gl} - \phi)]\frac{fy_{\omega 0}}{c_f}. \qquad (54)$$

In the embodiment, diffeomorphic transform 424 calculates equation (54) to give the first time derivative df. Diffeomorphic transform 424 outputs the estimated values $d\phi_m$ ($=\dot{\phi}_m$) and $\alpha\phi_m$ ($=\ddot{\phi}_m$) of the first and second time derivatives on line 426.

The first and second time derivatives $d\phi_m$ ($=\dot{\phi}_m$) and $\alpha\phi_m$ ($=\ddot{\phi}_m$) on line 426, trunnion angular position $\phi$ on line 242, and desired trunnion angular position $\phi^*$ on line 236 are used as inputs into a sliding mode controller 428. Sliding mode controller 428 outputs actuator command in the form of motor steps rate (or speed) v on line 228. To determine motor steps rate (or speed) v, the sliding mode controller 428 computes a control error σ and then motor steps rate v by calculating equations as follows.

$$\sigma = \alpha\phi_m + 2\zeta\omega_n d\phi_m + \omega_n^2(\phi - \phi^*) \qquad (55\text{-}1)$$

$$v = -K\frac{\sigma}{|\sigma|} \qquad (55\text{-}2)$$

where:

ζ is the damping coefficient;

$\omega_n$ is the natural frequency;

K is the switching gain.

If, in equation (55-2), switching gain K is increased sufficiently, σ converges to zero. From equation (55-1), we obtain the equation as follows $$\alpha\phi_m = -2\zeta\omega_n d\phi_m - \omega_n^2 \phi + \omega_n^2 \phi^* \qquad (56).$$

Equation (56) clearly states that trunnion angular position $\phi$ responds against desired trunnion angular position $\phi^*$ with the second order delay of damping coefficient ζ and natural frequency $\omega_n$.

Figure 17:
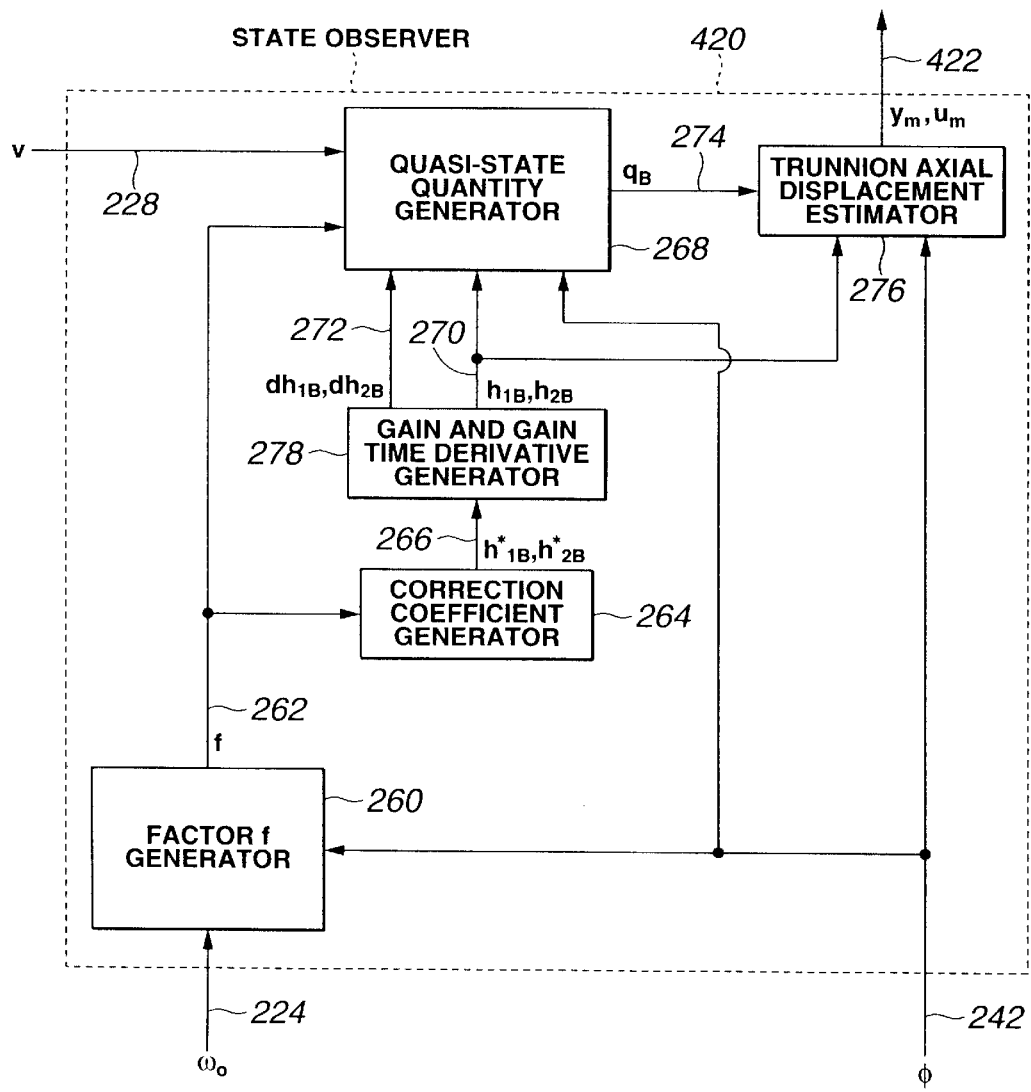
FIG. 17 is a control diagram of another state observer according to the present invention.

With reference now to FIG. 17, state observer 420 according to an embodiment of the present invention will be described. State observer 420 illustrated in FIG. 17 is substantially the same as state observer 252 illustrated in FIG. 9. Accordingly, the like reference numerals are used to denote like component parts or portions throughout FIGS. 9 and 17.

As different from state observer 252, instead of motor steps u, motor steps rate v on line 228 is used as an input to a quasi-state quantity generator 268. Besides, in FIG. 17, a trunnion axial displacement estimator 276 outputs estimated value $u_m$ of motor steps u in addition to estimated value $y_m$ of trunnion axial displacement, while, in FIG. 9, trunnion axial displacement estimator 276 outputs estimated value $y_m$ of trunnion axial displacement y only. Other differences may become apparent as discussion proceeds.

As described before, in order to compute estimated quantity $w_e$, the state observer 420 calculates the filter (51) to give the first time derivative $dq_B$ of quasi-state quantity $q_B$. The first time derivative $dq_B$ is integrated to give quasi-state quantity $q_B$, which is then put into the equation (49) to give the estimated quantity $w_e$ of system state quantity w. The calculation of equation (51) and the subsequent integral operation are carried out by quasi-state quantity generator 268 to give quasi-state quantity $q_B$. The calculation of equation (49) is carried out by trunnion axial displacement estimator 276 to give estimated quantity $w_e$. Estimator 276 outputs estimated value $y_m$ of trunnion axial displacement y and estimated value $u_m$ of motor steps u because they are matrix components of the estimated quantity $w_e$ of the system state quantity With continuing reference to FIG. 17, output shaft speed signal $\omega_o$ on line 224 and trunnion angular position signal $\phi$ on line 242 are used as inputs to a factor of proportionality f generator 260. Factor of proportionality generator 260 calculates equation (4) and outputs factor of proportionality f on line 262. Factor of proportionality f on line 262 is used as an input to a correction coefficient generator 264, which outputs correction coefficients $h_{1B}^*$ and $h_{2B}^*$ on line 266. As will be understood as discussion proceeds, correction coefficients $h_{1B}^*$ and $h_{2B}^*$ will work to keep transition matrix $A_{obB}$ of equation (51) unaltered. To determine such correction coefficients $h_{1B}^*$ and $h_{2B}^*$, the generator 264 calculates the equations as follows $$h_{1B}^* = \frac{-a_2 - k_{1B}}{f} \tag{57-1}$$

$$h_{2B}^* = -\frac{k_{2B}}{f}. \tag{57-2}$$

In the above equations (57-1) and (57-2), $k_{1B}$ and $k_{2B}$ are the coefficients that determine speed at which state observer 420 makes the estimation. Correction coefficients $h_{1B}^*$ and $h_{2B}^*$ will be described later.

Factor of proportionality f on line 262 is used as one input to generator 268. Actuator command on line 228 indicative of motor steps rate v is used as another input to generator 268. Trunnion angular position signal $\phi$ on line 242 is used as still another input to generator 268. Observer gain matrix $H_B$, which includes observer gains $h_{1B}$ and $h_{2B}$, on line 270 and observer gain first time derivative matrix $dH_B$, which includes observer gain first time derivatives $dh_{1B}$ and $dh_{2B}$, on line 272 are used as the other inputs to generator 268. Using them, generator 268 calculates equation (51) and integrates the result to determine quasi-state quantity $q_B$. Generator 268 outputs quasi-state quantity $q_B$ on line 274.

Quasi-state quantity $q_B$ on line 274 is used as one input to estimator 276. Trunnion angular position signal $\phi$ on line 242 is used as another input to estimator 276. Observer gain $H_B$ on line 270 is used as the other input to estimator 276. Estimator 276 calculates equation (49) to determine estimated quantity $w_e$ of system state quantity $w$. Estimated quantity $w_e$ includes, as its matrix elements, estimated value $y_m$ of trunnion angular displacement $y$ and estimated value $u_m$ of motor steps $u$. Estimator 276 outputs the estimated values $y_m$ and $u_m$ on line 422.

The before-mentioned correction coefficients $h_{1B}^*$ and $h_{2B}^*$ will now be described in relation to transition coefficient $A_{obB}$. Correction coefficients $h_{1B}^*$ and $h_{2B}^*$ on line 266 are used as inputs to a gain and gain time derivative generator 278. Generator 278 outputs observer gains $h_{1B}$ and $h_{2B}$ on line 270, and observer gain first time derivatives $dh_{1B}$ and $dh_{2B}$ on line 272.

In one embodiment of the present invention, generator 278 uses correction coefficients $h_{1B}^*$ and $h_{2B}^*$ as observer gains $h_{1B}$ and $h_{2B}$, respectively. Instead of differential operation, generator 278 uses a pseudo-differentiator to give the first time derivatives $dh_{1B}$ and $dh_{2B}$. Using correction coefficients $h_{1B}^*$ and $h_{2B}^*$ as observer gains $h_{1B}$ and $h_{2B}$, respectively, the transition coefficient $A_{obB}$ is kept unaltered as shown below $$A_{obB} = \begin{bmatrix} k_{1B} & b \\ k_{2B} & 0 \end{bmatrix}. \tag{58}$$

Using eigenvalue $\omega_{ob}$ of state observer 420, the matrix elements $k_{1B}$ and $k_{2B}$ of transition coefficient $A_{obB}$ are expressed as $$k_{1B} = -2\omega_{ob} \tag{59-1}$$

$$k_{2B} = -\frac{\omega_{ob}^2}{b}. \tag{59-2}$$

Rewriting the matrix elements of equation (58) using equations (59-1) and (59-2), we obtain $-\omega_{ob}$, $-\omega_{ob}$ as eigenvalue of transition matrix $A_{obB}$ of equation (51).

Consider now an error $e_{obB}$ between the system state quantity $w$ of equation (47) and the estimated quantity $w_e$ given by the state observer 420. The error $e_{obB}$ is given as $$e_{obB} = w - w_e \tag{60}.$$

Subtracting the equation (48) from equation (47) gives the following equation.

$$dw - dw_e = A_{22}(w - w_e) - H_B A_{12}(w - w_e) \tag{61-1}$$

Using the relationship expressed by equation (60), equation (61-1) may be written as $$de_{obB} = (A_{22} - H_B A_{12})e_{obB} \tag{61-2}.$$

As transition coefficient $A_{obB}$ is $(A_{22} - H_B A_{12})$, equation (61-2) may be written as $$de_{obB} = A_{obB} e_{obB} \tag{61-3}$$

As the eigenvalue of transition matrix $A_{obB}$ is $-\omega_{ob}$, $-\omega_{ob}$, the equation (61-3) clearly states that the error $e_{obB}$ will converge to zero with linear response exhibiting a certain time constant provided by the eigenvalue $-\omega_{ob}$, $-\omega_{ob}$.

With reference again to the gain and gain time derivative generator 278 shown in FIG. 17, in the embodiment, correction coefficients $h_{1B}^*$ and $h_{2B}^*$ on line 266 are used as observer gains $h_{1B}$ and $h_{2B}$.

In another exemplary embodiment of the present invention, corrected coefficients $h_{1B}^*$ and $h_{2B}^*$ are not equal to observer gains $h_{1B}$ and $h_{2B}$, respectively. Instead, they are used as inputs to low pass filters, respectively, of a gain and gain time derivative generator 278. The low pass filters are expressed as $$dh_{1B} = -a_{01}h_{1B} + a_{01}h_{1B}^* \tag{62-1}$$

$$dh_{2B} = -a_{02}h_{2B} + a_{02}h_{2B}^* \tag{62-2}$$

where:

$a_{01}$ and $a_{02}$ are the filter coefficients, respectively.

In this embodiment, integrating low pass filters (62-1) and (62-2) outputs observer gains $h_{1B}$ and $h_{2B}$, respectively, on line 270. Gain and gain time derivative generator 278 use outputs of filters (62-1) and (62-2), which may be regarded as mid values for calculation of observer gains, as the first time derivatives $dh_{1B}$, $dh_{2B}$ of observer gains $h_{1B}$, $h_{2B}$.

In the embodiment employing low pass filters, observer gains $h_{1B}$ and $h_{2B}$ are not completely equal to correction coefficients $h_{1B}^*$ and $h_{2B}^*$, respectively, because each of the observer gains is given by multiplying the corresponding one of the correction coefficients with the associated low pass filter. This indicates that transition coefficient $A_{obB}$ is not completely unaltered. However, in the embodiment, transition coefficient $A_{obB}$ is kept substantially unaltered by selecting filter coefficients $a_{01}$ and $a_{02}$ to sufficiently large enough to reduce a deviation of each of observer gains $h_{1B}$ and $h_{2B}$ from the associated one of correction coefficients $h_{1B}^*$ and $h_{2B}^*$ toward zero.

The preceding description on FIG. 17 in comparison with the description on FIG. 9 clearly reveals various other differences between state observers 420 and 252. According to one of such differences, in state observer 420, quasi-state quantity generator 268 calculates equation (51) and integrates the result to give quasi-state quantity $q_B$, while, in state observer 252, quasi-state quantity generator 268 calculates equation (21) and integrates the result to give quasi-state quantity $q_A$. According to another difference, in state observer 420, trunnion axial displacement estimator 276, calculates equation (49) to give estimated quantity $w_e$, while, in state observer 252, trunnion axial displacement estimator 276 calculates equation (19) to give estimated quantity $x_{Ae}$. According to still another difference, in state observer 420, correction coefficient generator 264 uses equations (57-1) and (57-2) to give correction coefficients $h_{1B}^*$ and $h_{2B}^*$, while, in state observer 252, correction coefficient generator 264 calculates equations (22-1) and (22-2) to give correction coefficients $h_{1A}^*$ and $h_{2A}^*$. According to further difference, in state observer 420, gain and gain time derivative generator 278 uses equations (59-1) and (59-2) in rewriting matrix elements $k_{1B}$ and $k_{2B}$ of transition matrix $A_{obB}$ expressed by equation (58), while, in state observer 252, gain and gain time derivative generator 278 uses equations (24-1) and (24-2) in rewriting matrix elements $k_{1A}$ and $k_{2A}$ of transition matrix $A_{obA}$ expressed by equation (23). According to the other difference, in state observer 420, generator 278 may use low pass filters as expressed by equations (62-1) and (62-2), while, in state observer 252, generator 278 may use low pass filters as expressed by equation (27-1) and (27-2).

From the preceding description, it will now be appreciated that observer gains $h_{1A}$ and $h_{2A}$ (or $h_{1B}$ and $h_{2B}$) and their first time derivatives are corrected with correction coefficients $h_{1A}^*$ and $h_{2A}^*$ (or $h_{1B}^*$ and $h_{2B}^*$) in a manner as previously described to keep transition matrix $A_{obA}$ (or $A_{obB}$) unaltered. As transition matrix $A_{obA}$ (or $A_{obB}$) is kept unaltered, error $e_{obA}=x_A-x_{Ae}$ (or $e_{obB}=w-w_e$) converges to zero. This means that, with very high accuracy, state observers 420 and 252 can estimate trunnion axial displacement y and, if needed, motor steps u, too.

Figure 18A:
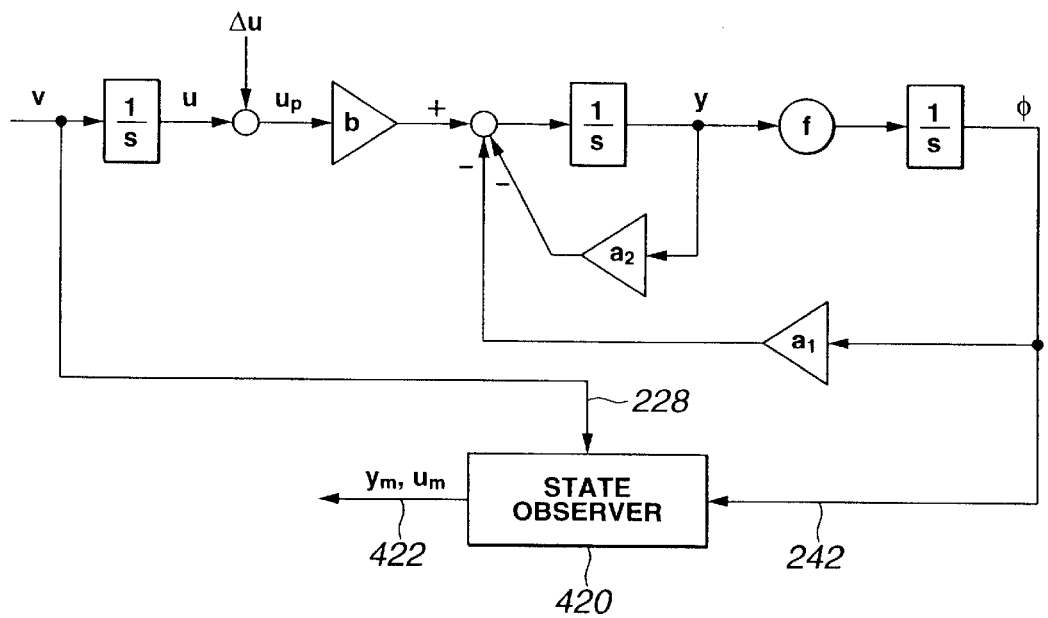
FIGS. 18A is a simplified view of a portion of FIG. 16 illustrating the situation where there occurs a continuous difference ($\Delta u$), in stepper motor, between commanded motor steps (u) and actual motor steps ($u_P$).

With reference again to control diagram shown in FIG. 16, motor steps rate v is used as system input to toroidal drive 12, and this motor steps rate v is controlled using state observer 420. Motor steps rate v is used also as an input to state observer 420 that may be expressed by equation (48). State observer 420 estimates motor steps u accounting for dynamic characteristic of stepper motor 188 and provides estimated value $u_m$ of motor steps u. Referring to FIG. 18A, we will describe on the degree of accuracy with which state observer 420 may estimate actual motor steps $u_P$. FIG. 18A is a portion of FIG. 16, illustrating the situation where there occurs a continuous difference $\Delta u$, in stepper motor 188, between commanded motor steps u, which is given after integrating motor steps rate v indicated by actuator command on line 228, and actual motor steps $u_P$. Normally, the difference $\Delta u$ is zero and the commanded motor steps u is equal to the actual motor steps $u_P$. Generally, the actual motor step $u_P$ may be expressed as $$u_P=u+\Delta u \qquad (63).$$

As equation (47) expresses the model of the system including toroidal drive 12, it may be modified to express a change in the dynamic characteristic due to the difference in motor steps $\Delta u$. Equation (47) may be modified as $$dw=A_{22}w+B_2v+A_{21}\phi+B_u\Delta u \qquad (64)$$

where:

$$B_u = \begin{bmatrix} b \\ 0 \end{bmatrix}.$$

State observer 420 is expressed by equation (48). Error $e_{obB}$ is given by equation (60). Subtracting equation (48) from equation (64) and using equation (60) gives the relationship as $$de_{obB}=A_{obB}e_{obB}+B_u\Delta u \qquad (65)$$

In equation (65), it is assumed that $de_{obB}=0$ because the error $e_{obB}$ under consideration remains unaltered. Then, we obtain the equation as follows $$A_{obB}e_{obB}+B_u\Delta u=0$$

$$\begin{bmatrix} -a_2-h_{1B}f & b \\ -h_{2B}f & 0 \end{bmatrix} e_{obB} = -\begin{bmatrix} b \\ 0 \end{bmatrix}\Delta u \qquad (66)$$

$$e_{obB} = -\frac{1}{h_{2B}fb}\begin{bmatrix} 0 & -b \\ h_{2B}f & -a_2-h_{1B}f \end{bmatrix}\begin{bmatrix} b \\ 0 \end{bmatrix}\Delta u.$$

$$= \begin{bmatrix} 0 \\ -\Delta u \end{bmatrix}$$

Using the equation (60), the above equation (66) may be simplified as $$e_{obB} = w-w_e = \begin{bmatrix} y-y_m \\ u-u_m \end{bmatrix} = \begin{bmatrix} 0 \\ -\Delta u \end{bmatrix}. \qquad (67)$$

Equation (67) clearly states the relationship that $u-u_m=-\Delta u$. Using this relationship and equation (63), we obtain an error between actual motor steps $u_P$ and estimated value $u_m$ as $$u_P-u_m=(u+\Delta u)-u_m=-u+\Delta u=0 \qquad (68).$$

This equation (68) clearly states that there occurs no error so that the estimated value $u_m$ corresponds exactly to the actual motor steps up under the presence of continuous difference $\Delta u$ of motor steps in stepper motor 188 that remains unaltered.

Figure 18B:
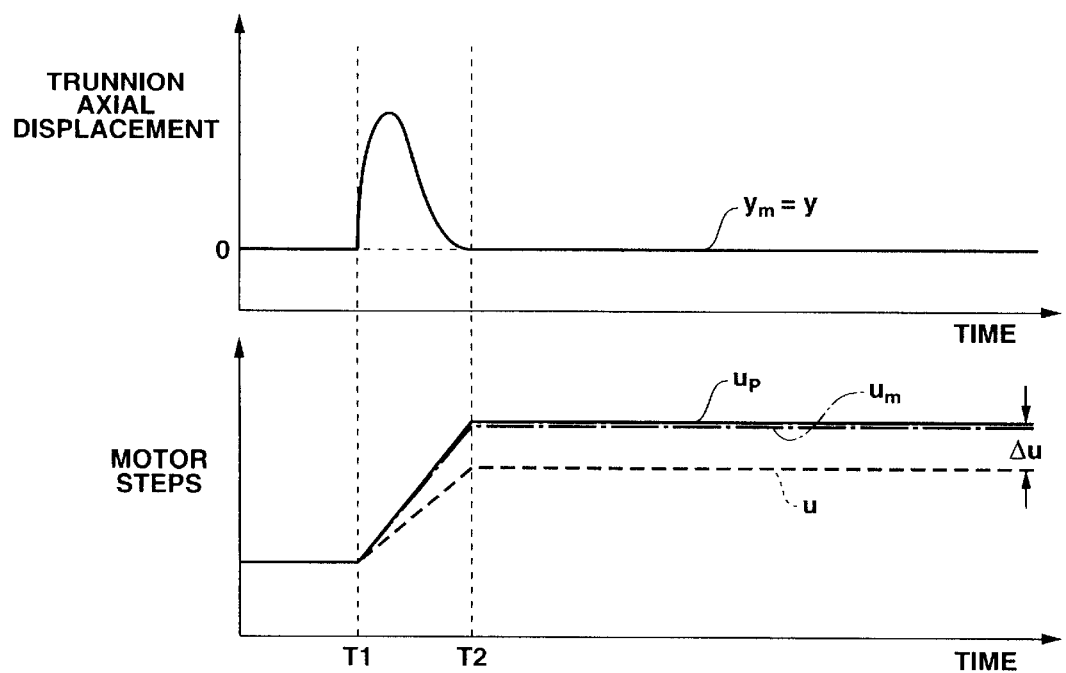
FIG. 18B depicts timing diagrams of estimated values ($y_m$ & $u_m$) upon and after the occurrence of such a continuous difference ($\phi^*$) during a time period T1–T2.

FIG. 18B illustrates the situation where, during a period of time from T1 to T2, a change in trunnion axial displacement y to initiate a ratio change in toroidal drive 12 has caused a continuous difference $\Delta u$ of motor steps in stepper motor 188. This difference $\Delta u$ remains unaltered after the moment T2. In FIG. 18B, the fully drawn line illustrates the variation of actual motor steps $u_P$, the dashed line illustrates the variation of commanded motor steps u, and the one-dot chain line illustrates the variation of the estimated value $u_m$ given by state observer 420. As illustrated in FIG. 18B, the estimated value $u_m$ corresponds exactly the actual motor steps $u_P$ under the presence of continuous difference $\Delta u$ of motor steps in stepper motor 188 that remains unaltered after the moment T2.

An example of how a controller, such as the T-CVT controller 210A (see FIG. 16), would implement the present invention can be understood with reference to FIGS. 19–24. The flow diagrams in FIGS. 19–24 illustrate a main routine and the associated sub routines of one exemplary implementation of the present invention. As will be appreciated by one of ordinary skill in the art, the steps illustrated with respect to FIGS. 19–24 are preferably repeated at predetermined intervals, such as 10 milliseconds, for example. Further, the steps illustrated with respect to FIGS. 19–24 are preferably stored in computer readable storage media 214 (see FIG. 3). Computer readable storage media 214 have data stored thereon representing instructions executable by T-CVT controller 210A to control toroidal drive 12 in a manner illustrated with respect to FIGS. 19–24.

Figure 19:
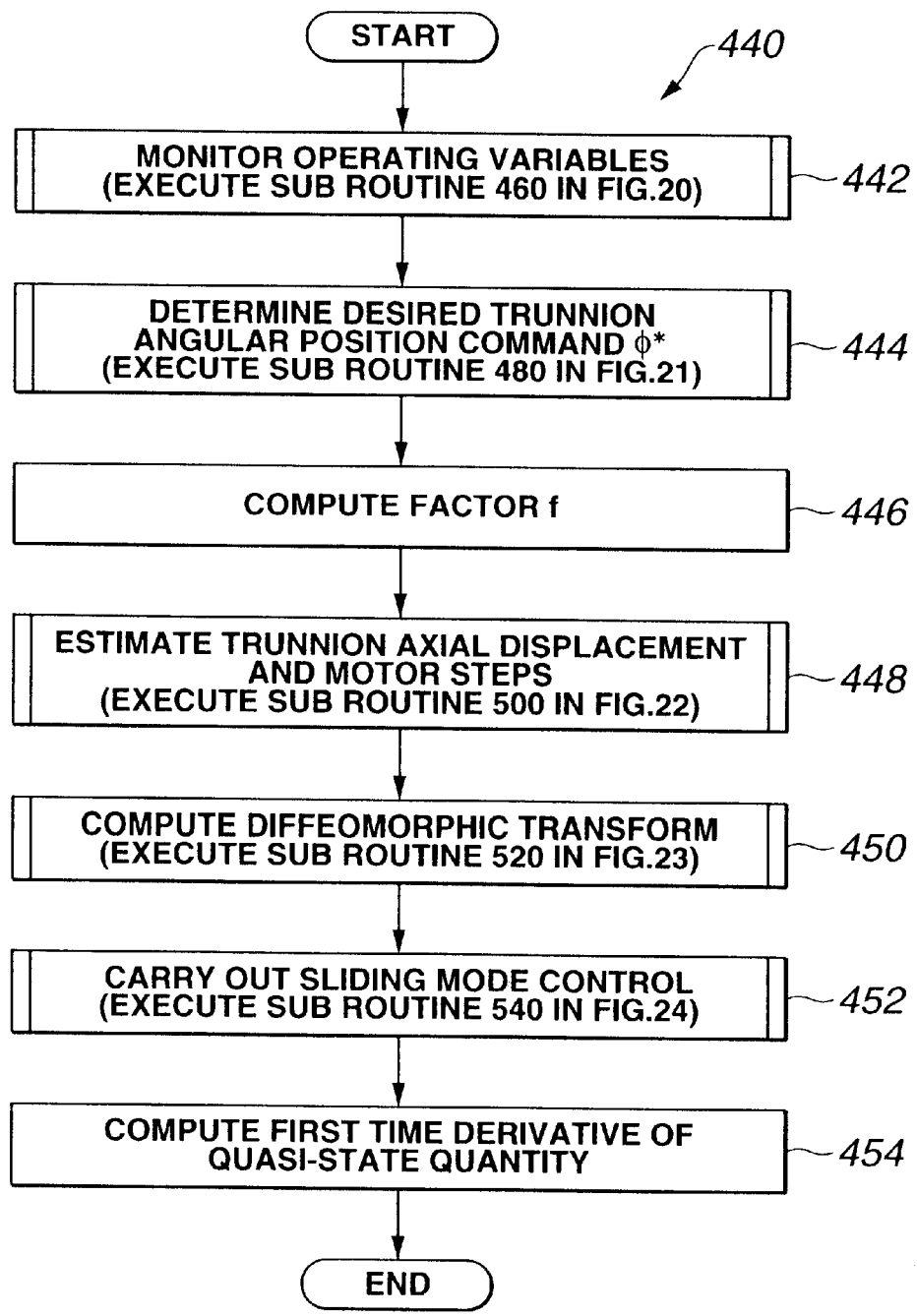
FIGS. 19 to 24 are flow diagrams implementing the present invention.

In FIG. 19, the main routine is generally designated by the reference numeral 440.

Figure 20:
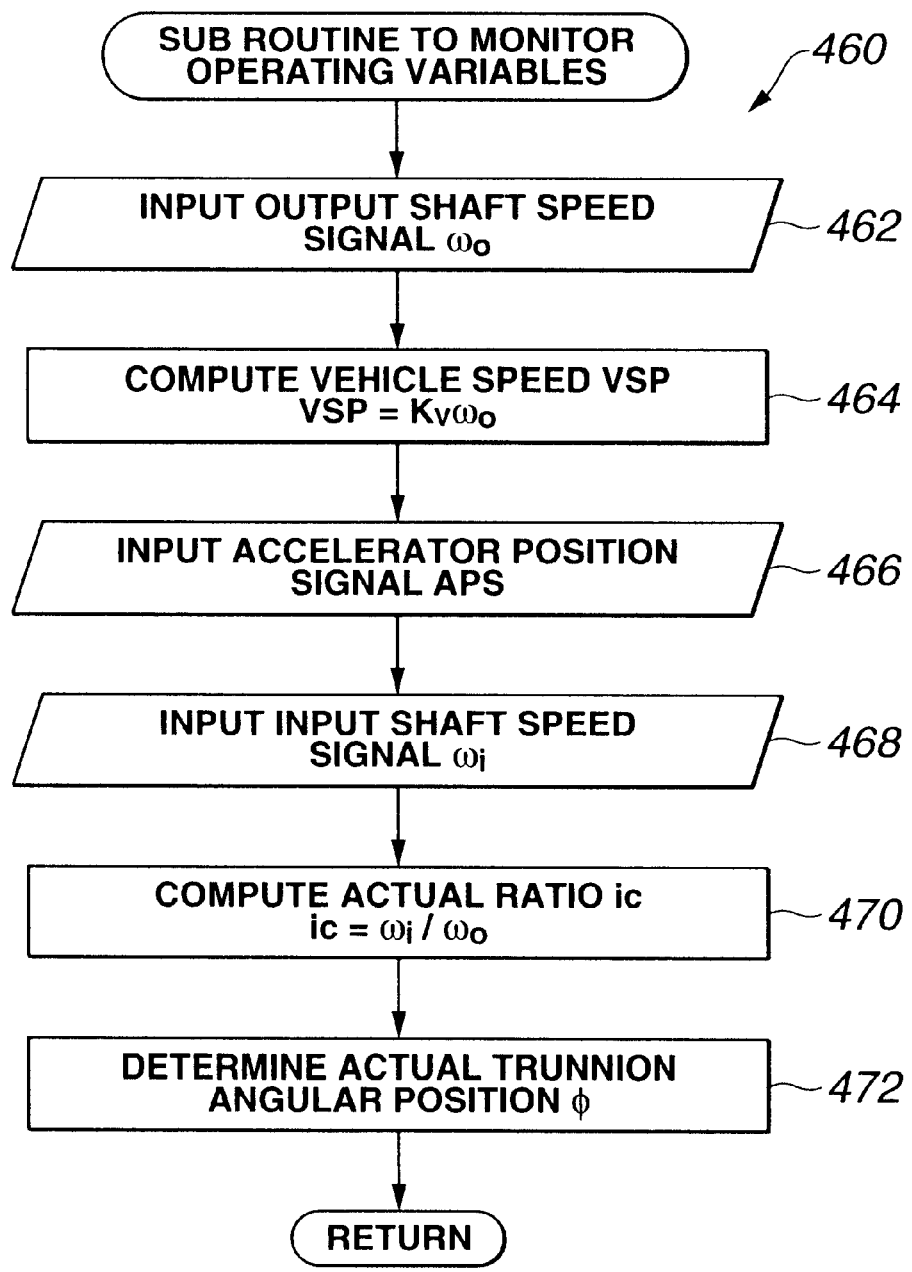

In step 442, the controller executes a sub routine 460 in FIG. 20 to monitor operating variables indicative of output shaft speed $\omega_o$, vehicle speed VSP, accelerator pedal position APS, input shaft speed $\omega_i$, actual speed ratio $i_c$ and actual trunnion angular position $\phi$.

Figure 21:
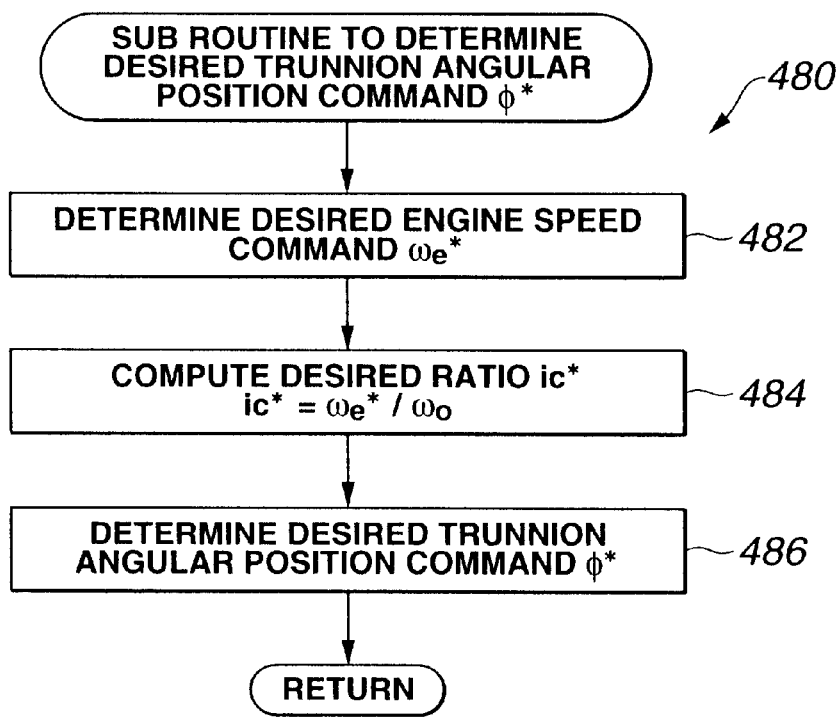

In step 444, the controller executes a sub routine 480 in FIG. 21 to determine desired trunnion angular position command $\phi^*$.

In step 446, the controller computes factor of proportionality f that is expressed by equation (4).

Figure 22:
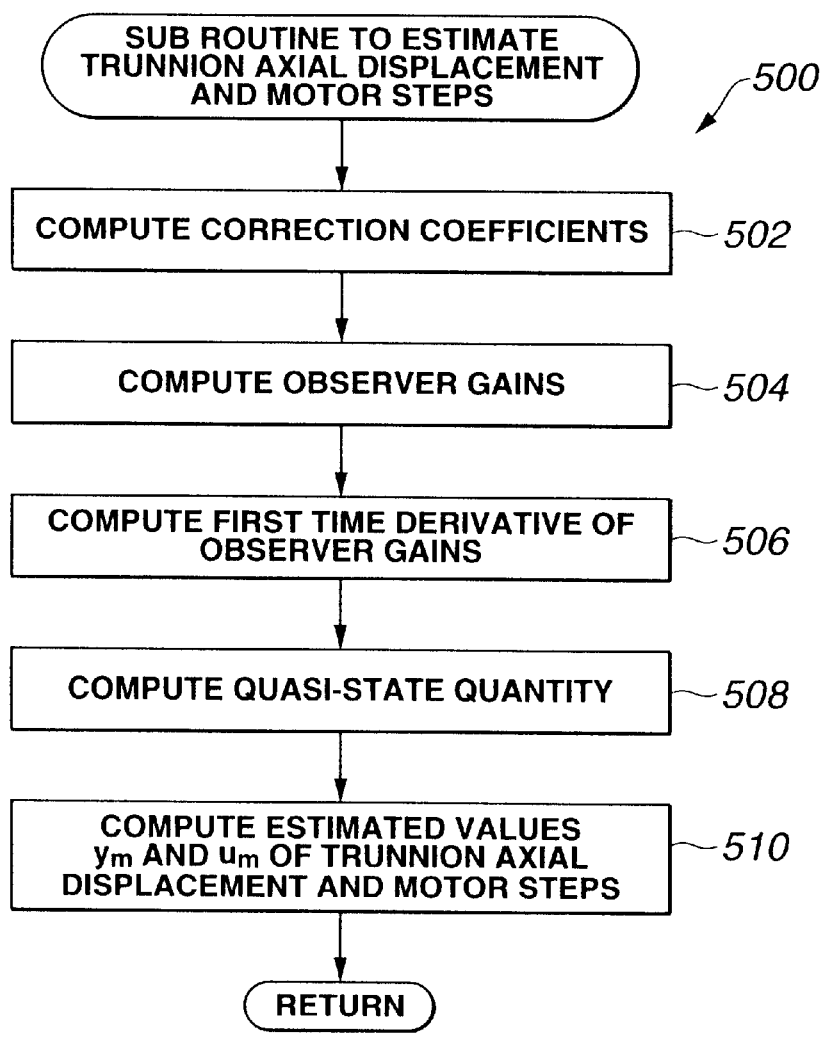

In step 448, the controller executes a sub routine 500 in FIG. 22 to estimate trunnion axial displacement y, giving an estimated value $y_m$ thereof, and motor steps u, giving an estimated value $u_m$ thereof.

Figure 23:
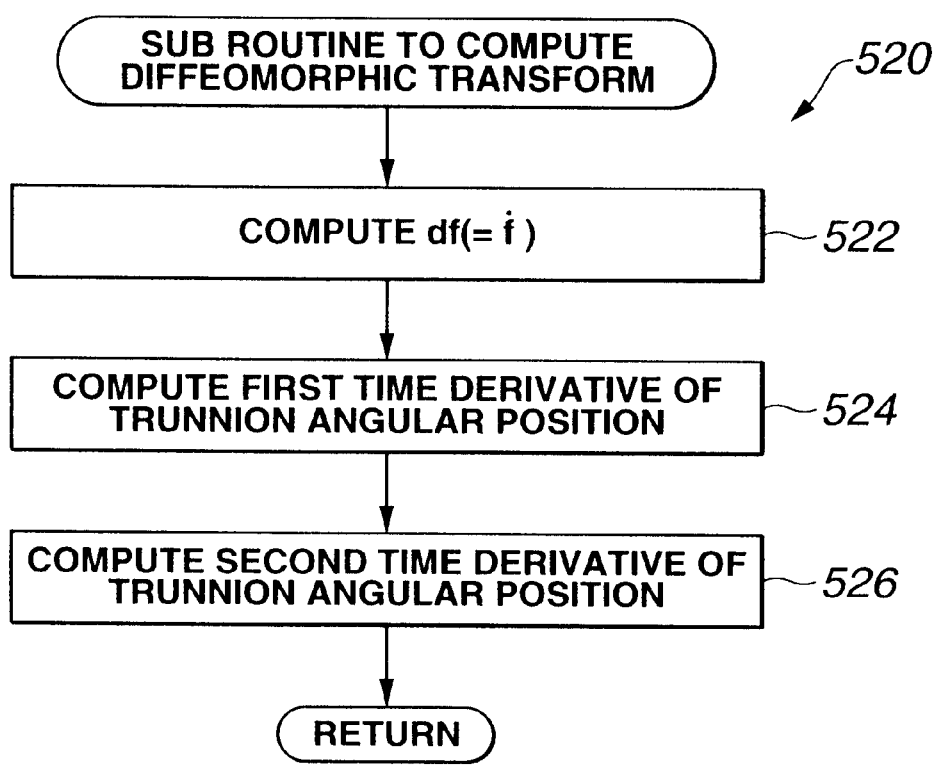

In step 450, the controller executes a sub routine 520 in FIG. 23 to computer diffeomorphic transform to give the first and second time derivatives $d\phi_m$ (=$\dot{\phi}_m$) and $\alpha\phi_m$ (=$\ddot{\phi}_m$) of trunnion angular position $\phi$.

Figure 24:
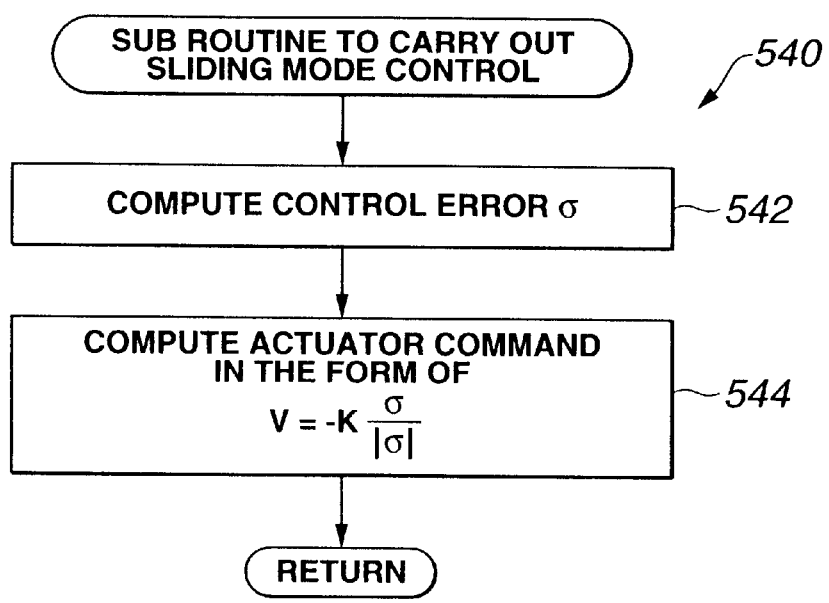

In step 452, the controller executes a sub routine 540 in FIG. 24 to carry out sliding mode control to give actuator command in the form of motor steps rate v.

In step 454, the controller computes the first time derivative $dq_B$ of quasi-state quantity $q_B$, which is expressed as $$dq_A = \begin{bmatrix} dq_{1B} \\ dq_{2B} \end{bmatrix} \quad (69)$$

$$= \begin{bmatrix} -a_2 - h_{1B}f & b \\ -h_{2B}f & 0 \end{bmatrix} \begin{bmatrix} q_{1B} \\ q_{2B} \end{bmatrix} +$$

$$\begin{bmatrix} -a_1 - a_2 h_{1B} + b h_{2B} - f h_{1B}^2 - d h_{1B} \\ -f h_{1B} h_{2B} - d h_{2B} \end{bmatrix} \phi + \begin{bmatrix} 0 \\ 1 \end{bmatrix} v$$

In equation (68), it is noted that the matrix $$\begin{bmatrix} -a_2 - h_{1B}f & b \\ -h_{2B}f & 0 \end{bmatrix}$$

is transition matrix $A_{obB}$ used in equation (51). Transition matrix $A_{obB}$ becomes unaltered if the correction coefficients $h_{1B}^*$ and $h_{2B}^*$ see equations (57-1) and (57-2), are used as observer gains $h_{1B}$ and $h_{2B}$. In this matrix, using the correction coefficients $h_{1B}^*$ and $h_{2B}^*$, for example, as observer gains $h_{1B}$ and $h_{2B}$, equation (69) may be written as $$\begin{bmatrix} dq_{1B} \\ dq_{2B} \end{bmatrix} = \begin{bmatrix} -2\omega_{ob} & b \\ -\frac{\omega_{ob}^2}{b} & 0 \end{bmatrix} \begin{bmatrix} q_{1B} \\ q_{2B} \end{bmatrix} + \quad (70)$$

$$\begin{bmatrix} -a_1 - a_2 h_{1B} + b h_{2B} - f h_{1B}^2 - d h_{1B} \\ -f h_{1B} h_{2B} - d h_{2B} \end{bmatrix} \phi +$$

$$\begin{bmatrix} 0 \\ 1 \end{bmatrix} v$$

In this case, for simplicity of computation, the controller may use equation (70) instead of equation (69) to give the first time derivatives $dq_{1B}$ and $dq_{2B}$.

Referring to FIG. 20, the sub routine 460 to monitor operating variables is now described. As mentioned above, this sub routine is executed in step 442 in FIG. 19.

In step 462, the controller inputs information of output shaft speed by receiving output shaft speed signal $\omega_o$ from sensor 204 (see FIG. 1).

In step 464, the controller computes vehicle speed VSP using the output shaft speed by calculating equation (6).

In step 466, the controller inputs information of accelerator pedal position by receiving accelerator pedal position signal APS from encoder associated with the vehicle accelerator pedal.

In step 468, the controller inputs information of input shaft speed by receiving input shaft speed $\omega_i$ from sensor 202 (see FIG. 1).

In step 470, the controller computers actual speed ratio ic that is expressed by equation (8).

In step 472, the controller inputs information of actual trunnion angular position by receiving actual trunnion angular position signal $\phi$ from the encoder arranged around trunnion 100 (see FIG. 2). If the provision of such encoder is discouraged, actual trunnion angular position $\phi$ may be obtained by using the actual ratio ic determined in step 470 in retrieving the illustrated relationship in FIG. 6.

Referring to FIG. 21, the sub routine 480 to determine desired trunnion angular position command $\phi^*$ is now described. This sub routine is executed in step 444 in FIG. 19.

In step 482, the controller determines desired engine speed command $\omega_o$ by looking into the illustrated data in FIG. 5, each being indexed by vehicle speed VSP and accelerator pedal position APS.

In step 484, the controller computes desired speed ratio ic*, which is expressed by equation (7).

In step 486, the controller determines desired trunnion angular position command $\phi^*$ by looking into the illustrated data in FIG. 6, each being indexed by desired ratio command ic*.

Referring to FIG. 22, the sub routine 500 to estimate trunnion axial displacement and motor steps is now described. This sub routine is executed in step 448 in FIG. 19.

In step 502, the controller computes correction coefficients $h_{1B}^*$ and $h_{2B}^*$. Using equations (59-1), (59-2), (57-1) and (57-2), the correction coefficients $h_{1B}^*$ and $h_{2B}^*$ are given as $$h_{1B}^* = \frac{-a_2 + 2\omega_{ob}}{f} \quad (71\text{-}1)$$

$$h_{2B}^* = \frac{\omega_{ob}^2}{bf}. \quad (71\text{-}2)$$

In step 502, the controller calculates the equations (71-1) and (71-2) using factor of proportionality f to give correction coefficients $h_{1B}^*$ and $h_{2B}^*$.

In step 504, the controller computes observer gains $h_{1B}$ and $h_{2B}$ by integrating the time derivatives of observer gains $dh_{1B}$ and $dh_{2B}$ that were obtained in step 454 in FIG. 19 during the last execution by the controller. To give observer gains $h_{1B}$ and $h_{2B}$, using the previously obtained values $h_{1B}$, $h_{2B}$, $dh_{1B}$ and $dh_{2B}$, the controller calculates the formulas as follows $$h_{1B} \leftarrow h_{1B} + T dh_{1B} \quad (72\text{-}1)$$

$$h_{2B} \leftarrow h_{2B} + T dh_{2B} \quad (72\text{-}2)$$

where:

T is the period of time of each of the predetermined intervals at which the steps illustrated in FIGS. 19–24 are executed and is equal to 0.01, indicative of 10 milliseconds.

In step 506, the controller computes the first time derivatives $dh_{1B}$ and $dh_{2B}$ of observer gains by calculating low pass filters expressed by equations (61-1) and (61-2) using corrected coefficients $h_{1B}^*$ and $h_{2B}^*$ that have been given in step 502 and observer gains $h_{1B}$ and $h_{2B}$ that have been given in step 504.

In step 508, the controller computes quasi-state quantity $q_{1B}$, $q_{2B}$ by integrating the first time derivatives $dq_{1B}$ and $dq_{2B}$ that were given in step 454 during the last cycle of execution. To give quasi-state quantities $q_{1B}$ and $q_{2B}$, using the previously obtained values $q_{1B}$, $q_{2B}$, $dq_{1B}$ and $dq_{2B}$, the controller calculates the formulas as follows $$q_{1B} \leftarrow q_{1B} + T dq_{1B} \quad (73\text{-}1)$$

$$q_{2B} \leftarrow q_{2B} + T dq_{2B} \quad (73\text{-}2).$$

In step 510, the controller computes estimated value $y_m$ of trunnion axial displacement y and estimated value $u_m$ of motor steps u. To give estimated values $y_m$ and $u_m$, using quasi-state quantities $q_{1B}$ and $q_{2B}$, actual trunnion angular position $\phi$, and observer gains $h_{1B}$ and $h_{2B}$, the controller calculates the equation as follows $$y_m = q_{1B} + h_{1B}\phi \quad (74\text{-}1)$$

$$u_m = q_{2B} + h_{2B}\phi \quad (74\text{-}2).$$

Referring to FIG. 23, the sub routine 520 to compute diffeomorphic transform is now described. This sub routine is executed in step 450 in FIG. 19.

In step 522, the controller computes the first time derivative df ($=\dot{f}$) of factor of proportionality f by using a pseudo-differentiator or calculating equation (54).

In step 524, the controller computes an estimated value $d\phi_m$ ($=\dot{\phi}_m$) of the first time derivative (speed) of trunnion angular position $\phi$ by calculating equation (52-1).

In step 526, the controller computes an estimated value of the second time derivative $\alpha\phi_m$ ($=\ddot{\phi}_m$) of trunnion angular position $\phi$ by calculating equation (52-2).

Referring to FIG. 24, the sub routine to carry out sliding mode control 540 is now described. This sub routine is executed in step 452 in FIG. 19.

In step 542, the controller computes a control error $\sigma$ using equation (55-1).

In step 544, the controller computes actuator command in the form of motor steps rate v using equation (55-2).

In the preceding embodiments of the present invention, trunnion angular position $\phi$ has been used as a physical quantity indicative of ratio established in toroidal drive 12. The present invention is not limited to the use of trunnion angular position and may be implemented by using any one of other various physical quantities indicative of ratio in toroidal drive 12. One such example is a ratio ic ($=\omega_i/\omega_o$) that is expressed by equation (8). This ratio ic is hereinafter indicated by the reference character G.

Referring to FIGS. 4 and 9, in another exemplary embodiment of the present invention, the ratio G is used instead of trunnion angular position signal $\phi$. The ratio G may be expressed as a predetermined function of trunnion angular position $\phi$ as follows.

$$G = h(\phi) = \frac{c_{g0} - \cos(2c_{g1} - \phi)}{c_{g0} - \cos\phi} \quad (75)$$

where:

$c_{g1}$ and $c_{g0}$ are the coefficients, which specify the toroidal drive 12.

The physical quantity dG indicative of ratio rate and trunnion axial displacement y are related by a factor of proportionality f' as $$dG = f'y \quad (76)$$

The factor of proportionality f' may be expressed as $$f' = \frac{\partial h}{\partial \phi} f \quad (77)$$

$$= \frac{\partial h}{\partial \phi} \frac{\cos(c_{g1} - \phi)\{c_{g0} - \cos(2c_{g1} - \phi)\}}{c_f} \omega_0$$

where:

$c_f$ is the coefficient, which specifies the toroidal drive 12.

In a similar manner to obtain the mathematical model of state observer as expressed by equation (18), let us now consider the mathematical model of a state observer that may give an estimated quantity $x_{Ae}$ of system state quantity $x_A$. The mathematical model of state observer may be expressed as $$dx_{Ae} = A_A x_{Ae} + B_A u + H_A'(dG - dG_m) \quad (78)$$

where:

$G_m$ is the estimated value of ratio G, and $H_A'$ is the observer gain $$dG = C_A' x_A', \quad dG_m = C_A' x_{Ae}'$$

$$C_A' = [0 \ f']$$

$$H_A' = \begin{bmatrix} h_{1A}' \\ h_{2A}' \end{bmatrix}.$$

In the equation (78), as the first time derivative dG is not directly measurable, a state change is made as explained below $$x_{Ae} = q_A + H_A'G \quad (79)$$

where:

$H_A'$ is the observer gain.

Using the equation (78) and the equation (78) as modified by a differentiating both sides of the latter, we obtain a filter as $$dq_A = A_{obA}' q_A + D_A'G + B_A u \quad (80)$$

where:

$A_{obA}'$ is the transition coefficient $$A_{obA}' = A_A - H_A'C_A'$$

$$D_A' = A_A H_A' - H_A'C_A'H_A' - dH_A.$$

With continuing reference to FIGS. 4 and 9, in order to compute estimated quantity $x_{Ae}$, a state observer 252 uses the filter (80) to give the first time derivative $dq_A$ of quasi-state quantity $q_A$. The first time derivative $dq_A$ is integrated to give quasi-state quantity $q_A$, which is then put into the equation (79) to give the estimated quantity $x_{Ae}$ of system state quantity $x_A$. The calculation of filter (80) and the subsequent integral operation are carried out by an quasi-state quantity generator 268 to give quasi-state quantity $q_A$. The calculation of equation (79) is carried out by a trunnion axial displacement estimator 276 to give estimated quantity $x_{Ae}$. Estimator 276 outputs estimated value $y_m$ of trunnion axial displacement y because it is one of matrix elements of the estimated quantity $x_{Ae}$.

In order to keep transition coefficient $A_{obA}'$ of filter (80) unaltered, factor of proportionality f' is used at a correction coefficient generator 264 in determining correction coefficients $h_{1A}'^*$ and $h_{2A}'^*$. To determine such correction coefficients $h_{1A}'^*$ and $h_{2A}'^*$, the generator 264 calculates the equations as follows $$h_{1A}'^* = 1 - \frac{k_{1A}}{f'} \tag{81-1}$$

$$h_{2A}'^* = -\frac{k_{2A} + a_2}{f'} \tag{81-2}$$

The above equations (81-1) and (81-2) are substantially the same as the before-mentioned equations (22-1) and (22-2), respectively, except the provision of factor of proportionality f' instead of factor of proportionality f.

Correction coefficients $h_{1A}'^*$ and $h_{2A}'^*$ are used as inputs into a gain and gain time derivative generator 278. In the embodiment of the present invention, generator 278 uses correction coefficients $h_{1A}'^*$ and $h_{2A}'^*$ as observer gains $h_{1A}'$ and $h_{2A}'$, respectively. The observer gain matrix $H_A'$ in equation (78) may be written as $$H_A' = \begin{bmatrix} h_{1A}'^* \\ h_{2A}'^* \end{bmatrix} = \begin{bmatrix} 1 - \frac{k_{1A}}{f'} \\ -\frac{k_{2A} + a_2}{f'} \end{bmatrix} \tag{82}$$

Instead of differential operation, generator 278 uses a pseudo-differentiator to give the first time derivatives $dh_{1A}'$ and $dh_{2A}'$. Using the correction coefficients $h_{1A}'^*$ and $h_{2A}'^*$ as observer gains $h_{1A}'$ and $h_{2A}'$, respectively, the transition matrix $A_{obA}'$ is kept unaltered as shown below $$A_{obA}' = \begin{bmatrix} 0 & k_{1A} \\ -a_1 & k_{2A} \end{bmatrix} \tag{83}$$

where:
the matrix elements $k_{1A}$ and $k_{2A}$ are the coefficients that determine speed at which state observer 252 makes the estimation.

Using eigenvalue $\omega_{ob}$ of state observer 252, the matrix elements $k_{1A}$ and $k_{2A}$ of transition coefficient $A_{obA}'$ of equation (80) are expressed by the before mentioned equations (24-1) and (24-2), respectively.

In another exemplary embodiment of the present invention, a low order state observer outputs an estimated value $y_m$ of trunnion axial displacement y using motor steps u and ratio G as inputs. The mathematical model of such a lower order state observer may be expressed as $$dy_m = -a_2 y_m + bu - a_1 h^{-1}(G) + h_r'(dG - dG_m) \tag{84}$$

where:
$h^{-1}(G)$ is an inverse function of the function expressed by equation (74);
$h_r'$ represents an observer gain;
$dG = f'y$
$dG_m = f'y_m$.
The mathematical model expressed by the equation (84) is manipulated into the form as expressed as $$dq_r' = (-a_2 - h_r'f')q_r' + bu + (-a_1 h^{-1}(G) - a_2 h_r'G + f'h_r'G - dh_r'G) \tag{85}$$

$$y_m = q_r' + h_r'G \tag{86}$$

where:
$q_r'$ is the quasi-state quantity;
$(-a_2 - h_r'f')$ is the transition coefficient.

This state observer has an eigenvalue of $\omega_{ob}$. Thus, a correction coefficient $h_r'^*$ may be expressed as $$h_r'^* = \frac{\omega_{ob} - a_2}{f'}. \tag{87}$$

Using the correction coefficient $h_r'^*$ as observer gain $h_r$, the transition matrix $(-a_2 - h_r'f')$ becomes $(-\omega_{ob})$ and is kept unaltered.

Referring to FIGS. 16 and 17, in an exemplary embodiment of the present invention, a state observer 420 outputs an estimated value $y_m$ of trunnion axial displacement y and an estimated value $u_m$ of motor steps u, using motor steps rate (or speed) v and ratio G as inputs. The mathematical model of state observer may be expressed as $$dw_e = A_{22} w_e + B_2 v + A_{21} h^{-1}(G) + H_B'(dG - dG_m) \tag{88}$$

where:
$dG = A_{12}'w$
$dG_m = A_{12}'w_e$ $$A_{12}' = [f' \quad 0]$$

$$H_B' = \begin{bmatrix} h_{1B}' \\ h_{2B}' \end{bmatrix}$$

As the first time derivative dG is not directly measurable, a state change is made as explained $$w_e = q_B + H_B'G \tag{89}$$

Using the equation (88) and the equation (89) as modified by differentiating both sides of the latter, we obtain a filter expressed as $$dq_B = A_{obB}'q_B + D_B'G + B_2 v \tag{90}$$

where:
$A_{obB}'$ is the transition coefficient $$A_{obB}' = A_{22} - H_B'A_{12}' = \begin{bmatrix} -a_2 - h_{1B}'f' & b \\ -h_{2B}'f' & 0 \end{bmatrix}$$

$$D_B' = A_{22} H_B'G + A_{12} h^{-1}(G) - H_B'A_{12}'H_B'G - dH_B'G.$$

With continuing reference to FIGS. 16 and 17, in order to compute estimated quantity we, state observer 420 uses filter (90) to give the first time derivative $dq_B$ of quasi-state quantity $q_B$. The first time derivative $dq_B$ is integrated to give quasi-state quantity $q_B$, which is then put into the equation (89) to give the estimated quantity $w_e$ of state quantity w. The calculation of filter (90) and the subsequent integral operation are carried out by an quasi-state quantity generator 268 in FIG. 17 to give quasi-state quantity $q_B'$. The calculation of equation (89) is carried out by a trunnion axial displacement estimator 276 in FIG. 17 to give estimated quantity $w_e$. Estimator 276 outputs estimated value $y_m$ of trunnion axial displacement y and estimated value $u_m$ of motor steps u because they are matrix elements of the estimated quantity $w_e$.

In order to keep transition matrix $A_{obB}'$ of equation (89) unaltered, factor of proportionality f' is used at a correction coefficient generator 264 in FIG. 17 in determining correction coefficients $h_{1B}'^*$ and $h_{2B}'^*$. To determine such correction coefficients $h_{1B}'^*$ and $h_{2B}'^*$, the generator 264 calculates the equations as follows $$h_{1B}'^* = \frac{-a_2 - k_{1B}}{f'} \quad (91\text{-}1)$$

$$h_{2B}'^* = -\frac{k_{2B}}{f'}. \quad (91\text{-}2)$$

The above equations (91-1) and (91-2) are substantially the same as the before-mentioned equations (57-1) and (57-2), respectively, except the provision of factor of proportionality f' instead of factor of proportionality f.

Correction coefficients $h_{1B}'^*$ and $h_{2B}'^*$ are used as inputs into a gain and gain time derivative generator 278 in FIG. 17. In the embodiment of the present invention, generator 278 uses correction coefficients $h_{1B}'^*$ and $h_{2B}'^*$ as observer gains $h_{1B}'$ and $h_{2B}'$, respectively. The observer gain matrix $H_B'$ in equation (88) may be written as $$H_B' = \begin{bmatrix} h_{1B}'^* \\ h_{2B}'^* \end{bmatrix} = \begin{bmatrix} \dfrac{-a_2 - k_{1B}}{f'} \\ -\dfrac{k_{2B}}{f'} \end{bmatrix}. \quad (92)$$

Instead of differential operation, generator 278 uses a pseudo-differentiator to give the first time derivatives $dh_{1B}'$ and $dh_{2B}'$. Using the correction coefficients $h_{1B}'^*$ and $h_{2B}'^*$ as observer gains $h_{1B}'$ and $h_{2B}'$, respectively, the transition matrix $A_{obB}'$ is kept unaltered.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-029547, filed Feb. 6, 2001, the disclosure of which is hereby incorporated by reference in its entirety.

What is claimed is:

1. A method for enhanced ratio control in a toroidal drive of a toroidal-type continuously variable transmission (T-CVT) including a ratio control element positionable in response to an actuator command to establish various ratios between input and output shaft speeds of the T-CVT, the toroidal drive having toroidal discs defining a toroidal cavity, and traction roller assemblies having pivot trunnions rotatably supporting traction rollers disposed in the toroidal cavity and engaged between the toroidal discs, the method comprising:

computing a factor of proportionality by which a first physical quantity and a second physical quantity are related, the first physical quantity being a trunnion axial displacement of a predetermined one of the pivot trunnions, the second physical quantity being indicative of a ratio rate of the ratio between the input and output shaft speeds of the T-CVT;

establishing a filter in the form of a characteristic equation that includes a third physical quantity and a fourth physical quantity, as inputs, a quasi-state quantity, as a state quantity, and coefficients including a transition coefficient for the quasi-state quantity, the transition coefficient including an observer gain, the third physical quantity being indicative of the ratio between the input and output shaft speeds of the T-CVT, the fourth physical quantity being indicated by the actuator command;

computing the quasi-state quantity using the filter;

computing an estimated quantity of a system state quantity of the T-CVT using the quasi-state quantity, the observer gain, and a fifth physical quantity indicative of a trunnion angular position of the predetermined pivot trunnion, the system state quantity including at least the first physical quantity; and correcting the observer gain in response to the factor of proportionality to keep the transition coefficient unaltered.

2. The method as claimed in claim 1, wherein the factor of proportionality is a predetermined function of the output shaft speed and the fifth physical quantity.

3. The method as claimed in claim 1, wherein the fourth physical quantity is motor steps.

4. The method as claimed in claim 1, wherein the fourth physical quantity is motor steps rate.

5. The method as claimed in claim 1, wherein the coefficients include a coefficient for the third physical quantity, and the coefficient for the third physical quantity includes the first time derivative of the observer gain.

6. The method as claimed in claim 5, wherein the correcting the observer gain comprises:

computing a correction coefficient in response to the factor of proportionality;

establishing a low pass filter including the correction coefficient as an input;

using an output of the low pass filter as the first time derivative of the observer gain; and using a time integral of the output of the low pass filter as the observer gain.

7. The method as claimed in claim 1, wherein the second physical quantity is the first time derivative of the trunnion angular position.

8. The method as claimed in claim 1, wherein the second physical quantity is the first time derivative of the ratio between the input and output shaft speeds of the T-CVT.

9. The method as claimed in claim 1, wherein the third physical quantity is the trunnion angular position.

10. The method as claimed in claim 1, wherein the third physical quantity is the ratio between the input and output shaft speeds of the T-CVT.

11. The method as claimed in claim 1, wherein the fifth physical quantity is the trunnion angular position.

12. The method as claimed in claim 1, wherein the transition coefficient is a transition matrix.

13. A system for enhanced ratio control in a toroidal drive of a toroidal-type continuously variable transmission (T-CVT) including a ratio control element positionable in response to an actuator command to establish various ratios between input and output shaft speeds of the T-CVT, the toroidal drive having toroidal discs defining a toroidal cavity, and traction roller assemblies having pivot trunnions rotatably supporting traction rollers disposed in the toroidal cavity and engaged between the toroidal discs, the system comprising:

a controller; and a computer readable storage media having data stored thereon representing instructions executable by the controller to compute a factor of proportionality by which a first physical quantity and a second physical quantity are related, the first physical quantity being a trunnion axial displacement of a predetermined one of the pivot trunnions, the second physical quantity being indicative of a ratio rate of the ratio between the input and output shaft speeds of the T-CVT;

establish a filter in the form of a characteristic equation that includes a third physical quantity and a fourth physical quantity, as inputs, a quasi-state quantity, as a state quantity, and coefficients including a transition coefficient for the quasi-state quantity, the transition coefficient including an observer gain, the third physical quantity being indicative of the ratio between the input and output shaft speeds of the T-CVT, the fourth physical quantity being indicated by the actuator command;

compute the quasi-state quantity using the filter;

compute an estimated quantity of a system state quantity of the T-CVT using the quasi-state quantity, the observer gain, and a fifth physical quantity indicative of a trunnion angular position of the predetermined pivot trunnion, the system state quantity including at least the first physical quantity; and correct the observer gain in response to the factor of proportionality to keep the transition coefficient unaltered.

14. A method for enhanced ratio control in a toroidal drive of a toroidal-type continuously variable transmission (T-CVT) including a ratio control element positionable in response to an actuator command to establish various ratios between input and output shaft speeds of the T-CVT, the toroidal drive having toroidal discs defining a toroidal cavity, and traction roller assemblies having pivot trunnions rotatably supporting traction rollers disposed in the toroidal cavity and engaged between the toroidal discs, the method comprising:

computing a factor of proportionality by which a first physical quantity and a second physical quantity are related, the first physical quantity being a trunnion axial displacement of a predetermined one of the pivot trunnions, the second physical quantity being indicative of a ratio rate of the ratio between the input and output shaft speeds of the T-CVT;

establishing a filter in the form of a characteristic equation that includes a third physical quantity and a fourth physical quantity, as inputs, a quasi-state quantity, as a state quantity, and coefficients including a transition coefficient for the quasi-state quantity, the transition coefficient including an observer gain, the third physical quantity being indicative of the ratio between the input and output shaft speeds of the T-CVT, the fourth physical quantity being indicated by the actuator command;

computing the quasi-state quantity using the filter;

computing an estimated quantity of a system state quantity of the T-CVT using the quasi-state quantity, the observer gain, and a fifth physical quantity indicative of a trunnion angular position of the predetermined pivot trunnion, the system state quantity including at least the first physical quantity;

generating a correction coefficient in response to the factor of proportionality; and correcting the observer gain in response to the correction coefficient to keep the transition coefficient unaltered.

15. The method as claimed in claim 14, wherein the correcting the observer gain comprises:

establishing a low pass filter including the correction coefficient as an input; and using a time integral of an output of the low pass filter as the observer gain.

16. The method as claimed in claim 15, wherein the coefficients include a coefficient for the third physical quantity, and the coefficient for the third physical quantity includes the a first time derivative of the observer gain.

17. The method as claimed in claim 16, wherein the correcting the observer gain also comprises:

using the output of the low pass filter as the first time derivative of the observer gain.

18. The method as claimed in claim 14, wherein the correcting the observer gain comprises:

using the correction coefficient as the observer gain.

19. A system for enhanced ratio control in a toroidal drive of a toroidal-type continuously variable transmission (T-CVT) including a ratio control element positionable in response to an actuator command to establish various ratios between input and output shaft speeds of the T-CVT, the toroidal drive having toroidal discs defining a toroidal cavity, and traction roller assemblies having pivot trunnions rotatably supporting traction rollers disposed in the toroidal cavity and engaged between the toroidal discs, the system comprising:

means for computing a factor of proportionality by which a first physical quantity and a second physical quantity are related, the first physical quantity being a trunnion axial displacement of a predetermined one of the pivot trunnions, the second physical quantity being indicative of a ratio rate of the ratio between the input and output shaft speeds of the T-CVT;

means for establishing a filter in the form of a characteristic equation that includes a third physical quantity and a fourth physical quantity, as inputs, a quasi-state quantity, as a state quantity, and coefficients including a transition coefficient for the quasi-state quantity, the transition coefficient including an observer gain, the third physical quantity being indicative of the ratio between the input and output shaft speeds of the T-CVT, the fourth physical quantity being indicated by the actuator command;

means for computing the quasi-state quantity using the filter;

means for computing an estimated quantity of a system state quantity of the T-CVT using the quasi-state quantity, the observer gain, and a fifth physical quantity indicative of a trunnion angular position of the predetermined pivot trunnion, the system state quantity including at least the first physical quantity; and means for correcting the observer gain in response to the factor of proportionality to keep the transition coefficient unaltered.

20. In a toroidal drive of a toroidal-type continuously variable transmission (T-CVT) including a ratio control element positionable in response to an actuator command to establish various ratios between input and output shaft speeds of the T-CVT, the toroidal drive having toroidal discs defining a toroidal cavity, and traction roller assemblies having pivot trunnions rotatably supporting traction rollers disposed in the toroidal cavity and engaged between the toroidal discs:

a computer readable storage media having stored thereon data representing instructions executable by a computer for enhanced ratio control in the toroidal drive, comprising:

instructions for computing a factor of proportionality by which a first physical quantity and a second physical quantity are related, the first physical quantity being a trunnion axial displacement of a predetermined one of the pivot trunnions, the second physical quantity being indicative of a ratio rate of the ratio between the input and output shaft speeds of the T-CVT;

instructions for establishing a filter in the form of a characteristic equation that includes a third physical quantity and a fourth physical quantity, as inputs, a quasi-state quantity, as a state quantity, and coefficients including a transition coefficient for the quasi-state quantity, the transition coefficient including an observer gain, the third physical quantity being indicative of the ratio between the input and output shaft speeds of the T-CVT, the fourth physical quantity being indicated by the actuator command;

instructions for computing the quasi-state quantity using the filter;

instructions for computing an estimated quantity of a system state quantity of the T-CVT using the quasi-state quantity, the observer gain, and a fifth physical quantity indicative of a trunnion angular position of the predetermined pivot trunnion, the system state quantity including at least the first physical quantity; and instructions for correcting the observer gain in response to the factor of proportionality to keep the transition coefficient unaltered.

* * * * *